(12) United States Patent
Xu et al.

(10) Patent No.: US 11,564,247 B2
(45) Date of Patent: Jan. 24, 2023

(54) TIME DOMAIN RESOURCE ASSIGNMENT FOR MULTIPLE CELLS SCHEDULED BY A SINGLE DOWNLINK CONTROL INFORMATION MESSAGE

(71) Applicant: QUALCOMM Incorporated, San Diego, CA (US)

(72) Inventors: Huilin Xu, San Diego, CA (US); Xiaoxia Zhang, San Diego, CA (US); Kazuki Takeda, Tokyo (JP); Mostafa Khoshnevisan, San Diego, CA (US); Wanshi Chen, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/158,262

(22) Filed: Jan. 26, 2021

(65) Prior Publication Data

US 2021/0258999 A1 Aug. 19, 2021

Related U.S. Application Data

(60) Provisional application No. 62/976,065, filed on Feb. 13, 2020.

(51) Int. Cl.
*H04W 72/12* (2009.01)
*H04W 72/04* (2009.01)

(52) U.S. Cl.
CPC ..... *H04W 72/1289* (2013.01); *H04W 72/044* (2013.01)

(58) Field of Classification Search
CPC .............. H04W 72/1289; H04W 72/044
See application file for complete search history.

(56) References Cited

U.S. PATENT DOCUMENTS 11,212,056 B2 * 12/2021 Li .................. H04W 72/10
2019/0261367 A1 * 8/2019 Wu ................. H04L 5/0094
(Continued)

FOREIGN PATENT DOCUMENTS

WO WO-2019215888 A1 * 11/2019 ........... H04L 1/0068

OTHER PUBLICATIONS

International Search Report and Written Opinion—PCT/US2021/015252—ISA/EPO—dated May 27, 2021.
(Continued)

*Primary Examiner* — Rasheed Gidado
(74) *Attorney, Agent, or Firm* — Harrity & Harrity, LLP

(57) ABSTRACT

Various aspects of the present disclosure generally relate to wireless communication. In some aspects, a user equipment (UE) may receive a single downlink control information (DCI) message that schedules communications on multiple cells, wherein the single DCI message indicates multiple time domain resource assignments (TDRAs) corresponding to the multiple cells, wherein each of the multiple TDRAs corresponds to a different scheduled communication; and communicate using the multiple TDRAs corresponding to the multiple cells, wherein the communicating comprises: transmitting the communications using the multiple TDRAs corresponding to the multiple cells, or receiving the communications using the multiple TDRAs corresponding to the multiple cells. Numerous other aspects are provided.

30 Claims, 12 Drawing Sheets

(56) References Cited

U.S. PATENT DOCUMENTS

2021/0006313 A1* 1/2021 Rune .................... H04L 5/0023
2021/0307044 A1* 9/2021 Bae .................. H04W 72/0446

OTHER PUBLICATIONS

NTT Docomo., et al., "PDCCH Enhancements for URLLC", 3GPP TSG RAN WG1 #98bis, 3GPP Draft; R1-1911175, 3rd Generation Partnership Project (3GPP), Mobile Competence Centre, 650, Route Des Lucioles, F-06921 Sophia-Antipolis Cedex, France, vol. Ran WG1, No. Chongqing, China, Oct. 14, 2019-Oct. 20, 2019, Oct. 7, 2019 (Oct. 7, 2019), pp. 1-11, XP051809014, Retrieved from the Internet: URL: https://www.3gpp.org/ftp/tsg_ran/WG1_RL1/TSGR1_98b/Docs/R1-1911175.zip, R1-1911175.docx [retrieved on Oct. 7, 2019], p. 4 Point 2: TDRA.

* cited by examiner

305 PDSCH TDRA Table

| Row Index | dmrs-TypeA-Position | PDSCH mapping type | $K_0$ | S | L |
|---|---|---|---|---|---|
| 1 | 2 | Type A | 0 | 2 | 12 |
|  | 3 | Type A | 0 | 3 | 11 |
| ... | ... | ... | ... | ... | ... |
| 9 | 2, 3 | Type B | 0 | 5 | 2 |
| ... | ... | ... | ... | ... | ... |

310 PUSCH TDRA Table

| Row Index | PUSCH mapping type | $K_2$ | S | L |
|---|---|---|---|---|
| 1 | Type A | 0 | 0 | 14 |
| ... | ... | ... | ... | ... |
| 10 | Type A | 1 | 0 | 10 |
| ... | ... | ... | ... | ... |

FIG. 3

TIME DOMAIN RESOURCE ASSIGNMENT FOR MULTIPLE CELLS SCHEDULED BY A SINGLE DOWNLINK CONTROL INFORMATION MESSAGE

CROSS-REFERENCE TO RELATED APPLICATION

This Patent Application claims priority to U.S. Provisional Patent Application No. 62/976,065, filed on Feb. 13, 2020, entitled "TIME DOMAIN RESOURCE ASSIGNMENT FOR MULTIPLE CELLS SCHEDULED BY A SINGLE DOWNLINK CONTROL INFORMATION MESSAGE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for time domain resource assignment for multiple cells scheduled by a single downlink control information message.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving a single downlink control information (DCI) message that schedules communications on multiple cells, wherein the single DCI message indicates multiple time domain resource assignments (TDRAs) corresponding to the multiple cells, wherein each of the multiple TDRAs corresponds to a different scheduled communication; and communicating using the multiple TDRAs corresponding to the multiple cells, wherein the communicating comprises: transmitting the communications using the multiple TDRAs corresponding to the multiple cells, or receiving the communications using the multiple TDRAs corresponding to the multiple cells.

In some aspects, a method of wireless communication, performed by a base station, may include transmitting a single DCI message that schedules communications on multiple cells, wherein the single DCI message indicates multiple TDRAs corresponding to the multiple cells, wherein each of the multiple TDRAs corresponds to a different scheduled communication; and communicating using the multiple TDRAs corresponding to the multiple cells, wherein the communicating comprises: transmitting the communications using the multiple TDRAs corresponding to the multiple cells, or receiving the communications using the multiple TDRAs corresponding to the multiple cells.

In some aspects, a UE for wireless communication may include a memory and one or more processors operatively coupled to the memory. The memory and the one or more processors may be configured to receive a single DCI message that schedules communications on multiple cells, wherein the single DCI message indicates multiple TDRAs corresponding to the multiple cells, wherein each of the multiple TDRAs corresponds to a different scheduled communication; and communicate using the multiple TDRAs corresponding to the multiple cells, wherein the communicating comprises: transmitting the communications using the multiple TDRAs corresponding to the multiple cells, or receiving the communications using the multiple TDRAs corresponding to the multiple cells.

In some aspects, a base station for wireless communication may include a memory and one or more processors operatively coupled to the memory. The memory and the one or more processors may be configured to transmit a single DCI message that schedules communications on multiple cells, wherein the single DCI message indicates multiple TDRAs corresponding to the multiple cells, wherein each of the multiple TDRAs corresponds to a different scheduled communication; and communicate using the multiple TDRAs corresponding to the multiple cells, wherein the communicating comprises: transmitting the communications using the multiple TDRAs corresponding to the multiple cells, or receiving the communications using the multiple TDRAs corresponding to the multiple cells.

In some aspects, a non-transitory computer-readable medium may store one or more instructions for wireless communication. The one or more instructions, when executed by one or more processors of a UE, may cause the one or more processors to receive a single DCI message that schedules communications on multiple cells, wherein the single DCI message indicates multiple TDRAs corresponding to the multiple cells, wherein each of the multiple TDRAs corresponds to a different scheduled communication; and communicate using the multiple TDRAs corresponding to the multiple cells, wherein the communicating comprises: transmitting the communications using the multiple TDRAs corresponding to the multiple cells, or receiving the communications using the multiple TDRAs corresponding to the multiple cells.

In some aspects, a non-transitory computer-readable medium may store one or more instructions for wireless communication. The one or more instructions, when executed by one or more processors of a base station, may cause the one or more processors to transmit a single DCI message that schedules communications on multiple cells, wherein the single DCI message indicates multiple TDRAs corresponding to the multiple cells, wherein each of the multiple TDRAs corresponds to a different scheduled communication; and communicate using the multiple TDRAs corresponding to the multiple cells, wherein the communicating comprises: transmitting the communications using the multiple TDRAs corresponding to the multiple cells, or receiving the communications using the multiple TDRAs corresponding to the multiple cells.

In some aspects, an apparatus for wireless communication may include means for receiving a single DCI message that schedules communications on multiple cells, wherein the single DCI message indicates multiple TDRAs corresponding to the multiple cells, wherein each of the multiple TDRAs corresponds to a different scheduled communication; and means for communicating using the multiple TDRAs corresponding to the multiple cells, wherein the means for communicating comprises: means for transmitting the communications using the multiple TDRAs corresponding to the multiple cells, or means for receiving the communications using the multiple TDRAs corresponding to the multiple cells.

In some aspects, an apparatus for wireless communication may include means for transmitting a single DCI message that schedules communications on multiple cells, wherein the single DCI message indicates multiple TDRAs corresponding to the multiple cells, wherein each of the multiple TDRAs corresponds to a different scheduled communication; and means for communicating using the multiple TDRAs corresponding to the multiple cells, wherein the means for communicating comprises: means for transmitting the communications using the multiple TDRAs corresponding to the multiple cells, or means for receiving the communications using the multiple TDRAs corresponding to the multiple cells.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating example time domain resource assignments (TDRAs), in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
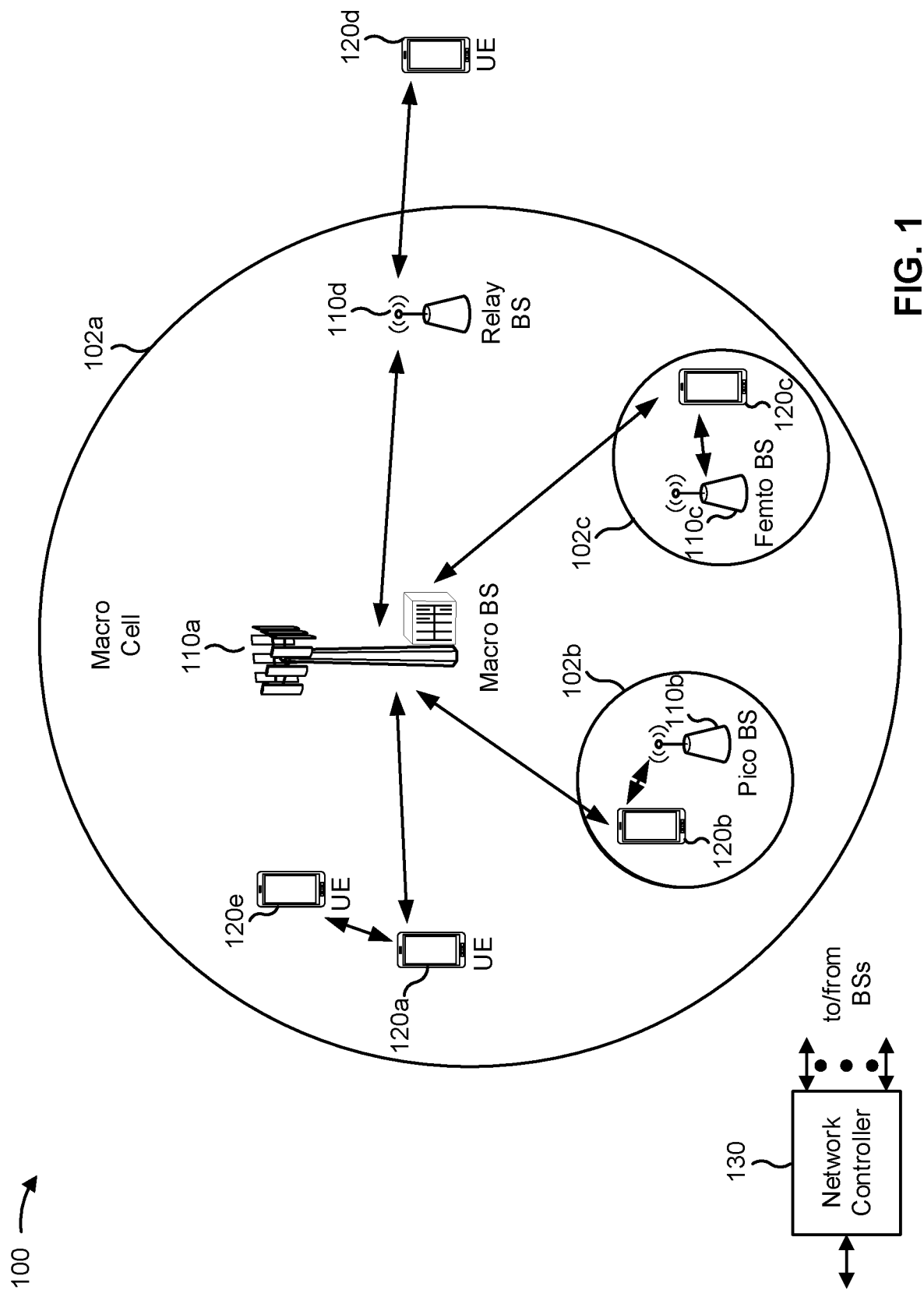
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
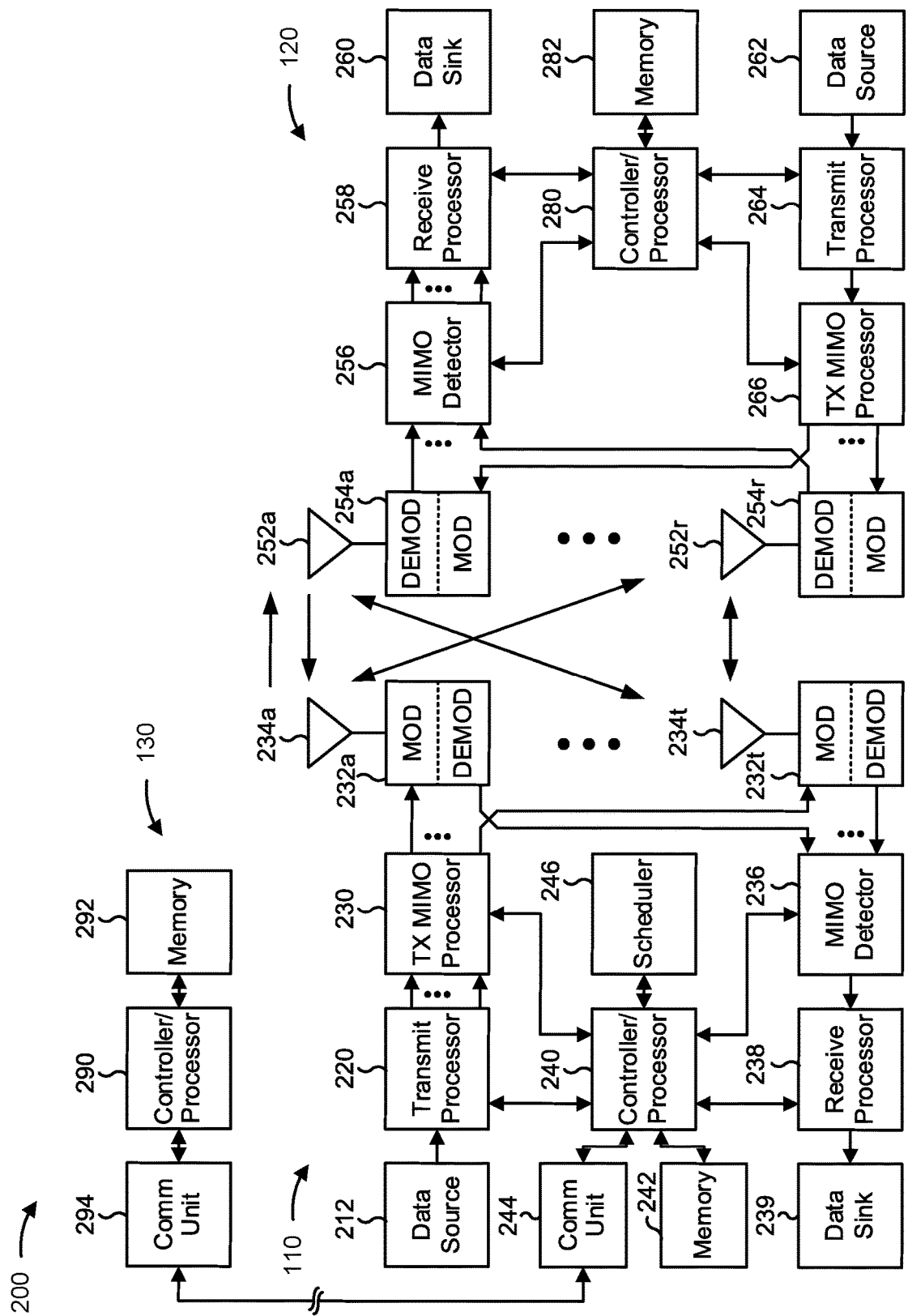
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-12.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-12.

Controller/processor 240 of base station 110, controller/processor 280 of UE 120, and/or any other component(s) of FIG. 2 may perform one or more techniques associated with time domain resource assignment (TDRA) for multiple cells scheduled by a single downlink control information (DCI) message, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, UE 120 may include means for receiving a single DCI message that schedules communications on multiple cells, wherein the single DCI message indicates multiple TDRAs corresponding to the multiple cells, wherein each of the multiple TDRAs corresponds to a different scheduled communication; and/or means for communicating using the multiple TDRAs corresponding to the multiple cells, wherein the means for communicating comprises: means for transmitting the communications using the multiple TDRAs corresponding to the multiple cells, or means for receiving the communications using the multiple TDRAs corresponding to the multiple cells. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for transmitting a single DCI message that schedules communications on multiple cells, wherein the single DCI message indicates multiple TDRAs corresponding to the multiple cells, wherein each of the multiple TDRAs corresponds to a different scheduled communication; and/or means for communicating using the multiple TDRAs corresponding to the multiple cells, wherein the means for communicating comprises: means for transmitting the communications using the multiple TDRAs corresponding to the multiple cells, or means for receiving the communications using the multiple TDRAs corresponding to the multiple cells. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating example time domain resource assignments, in accordance with the present disclosure. FIG. 3 shows an example downlink time domain resource assignment (TDRA) table 305 and an example uplink TDRA table 310. The downlink TDRA table 305 may be, for example, a physical downlink shared channel (PDSCH) TDRA table. The uplink TDRA table 310 may be, for example, a physical uplink shared channel (PUSCH) TDRA table. In some aspects, the base station 110 and the UE 120 may use different TDRA tables than those shown in FIG. 3, such as for different configurations, different cells, different sub-carrier spacings of cells, and/or the like.

When scheduling a communication, a base station 110 may transmit downlink control information (DCI) that indicates a TDRA for the communication. For example, the DCI may include a TDRA field that includes a TDRA index value. The TDRA index value may indicate a row index of a corresponding TDRA table, and the row index may correspond to a set of TDRA parameters (sometimes referred to as scheduling parameters or scheduling information). The base station 110 and the UE 120 may use those TDRA parameters for the scheduled communications. In the examples shown in FIG. 3, a TDRA index value of m in the DCI may correspond to a row index of m+1 in the TDRA table. For example, a TDRA index value of 0 may correspond to a row index of 1.

For a downlink communication (e.g., a PDSCH communication), the TDRA parameters may include, for example, a $K_0$ value, an S value, and an L value. The $K_0$ value may represent a scheduling offset (e.g., in number of slots) between the slot containing the scheduling DCI (that schedules the PDSCH communication) and the slot containing the scheduled PDSCH communication (scheduled by the scheduling DCI). The S value may represent a starting symbol for the PDSCH communication in the indicated slot. The L value may represent a length (e.g., a number of consecutive symbols) of the PDSCH communication (e.g., in the indicated slot). In some aspects, the same row index value may correspond to a different set of TDRA parameters depending on a Type A demodulation reference signal (DMRS) position (e.g., a symbol within a resource block that contains the DMRS), a PDSCH mapping type (e.g., indicating a starting symbol of the DMRS, a length of the DMRS, and/or whether slot-based scheduling or mini-slot-based scheduling is used), and/or the like.

For an uplink communication (e.g., a PUSCH communication), the TDRA parameters may include, for example, a $K_2$ value, an S value, and an L value. The $K_2$ value may represent a scheduling offset (e.g., in number of slots) between the slot containing the scheduling DCI (that schedules the PUSCH communication) and the slot containing the scheduled PUSCH communication (scheduled by the scheduling DCI). The S value may represent a starting symbol for the PUSCH communication in the indicated slot. The L value may represent a length (e.g., a number of consecutive symbols) of the PUSCH communication (e.g., in the indicated slot). In some aspects, the same row index value may correspond to a different set of TDRA parameters depending on, for example, a PUSCH mapping type (e.g., indicating a starting symbol of the DMRS, a length of the DMRS, and/or whether slot-based scheduling or mini-slot-based scheduling is used).

As indicated above, FIG. 3 is provided as an example. Other examples may differ from what is described with respect to FIG. 3.

Figure 4:
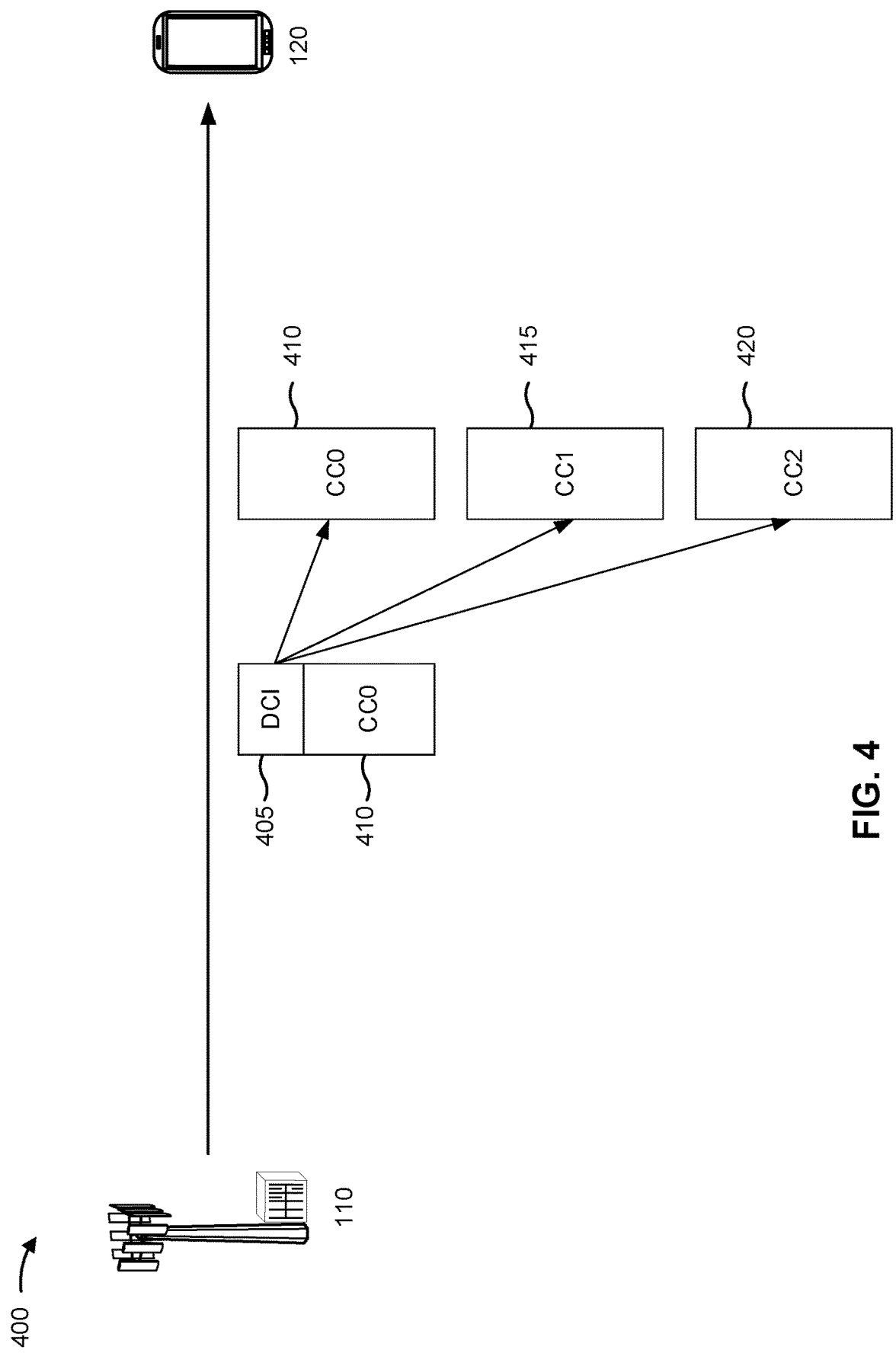
FIG. 4 is a diagram illustrating an example of downlink control information (DCI) that schedules multiple cells, in accordance with the present disclosure.

FIG. 4 is a diagram illustrating an example 400 of DCI (e.g., a single DCI message) that schedules multiple cells, in accordance with the present disclosure. As shown in FIG. 4, a base station 110 and a UE 120 may communicate with one another.

As shown, the base station 110 may transmit, to the UE 120, DCI 405 (e.g., a single DCI message) that schedules multiple communications for the UE 120. The multiple communications may be scheduled for at least two different cells. In some cases, a cell may be referred to as a carrier or a component carrier (CC). In some cases, DCI that schedules a communication for a cell via which the DCI is transmitted may be referred to as self-carrier (or self-cell) scheduling DCI. In some cases, DCI that schedules a communication for a cell via which the DCI is transmitted may be referred to as cross-carrier (or cross-cell) scheduling DCI. In some aspects, the DCI 405 may be cross-carrier scheduling DCI, and may or may not be self-carrier scheduling DCI. In some aspects, the DCI 405 that schedules communications in at least two cells may be referred to as combination DCI, a single DCI message that schedules communications on multiple cells, and/or the like. Different cells scheduled by the DCI 405 may have the same sub-carrier spacing (SCS) or different SCSs.

In example 400, the DCI 405 schedules a communication for a first cell 410 that carries the DCI 405 (shown as CC0), schedules a communication for a second cell 415 that does not carry the DCI 405 (shown as CC1), and schedules a communication for a third cell 420 that does not carry the DCI 405 (shown as CC2). In some aspects, the DCI 405 may schedule communications on a different number of cells than shown in FIG. 4 (e.g., two cells, four cells, five cells, and so on). The number of cells may be greater than or equal to two.

A communication scheduled by the DCI 405 may include a data communication, such as a physical downlink shared channel (PDSCH) communication, a physical uplink shared channel (PUSCH) communication, and/or the like. For a data communication, the DCI 405 may schedule a single transport block (TB) across multiple cells or may separately schedule multiple TBs in the multiple cells. Additionally, or alternatively, a communication scheduled by the DCI 405 may include a reference signal, such as a channel state information reference signal (CSI-RS), a sounding reference signal (SRS), and/or the like. For a reference signal, the DCI 405 may trigger a single resource for reference signal transmission across multiple cells or may separately schedule multiple resources for reference signal transmission in the multiple cells. In some cases, scheduling information in the DCI 405 may be indicated once and reused for multiple communications (e.g., on different cells), such as a modulation and coding scheme (MCS), a resource to be used for acknowledgement (ACK) or negative acknowledgement (NACK) of a communication scheduled by the DCI 405, a resource allocation for a scheduled communication, and/or the like, to conserve signaling overhead.

In some aspects, the base station 110 may configure a cell with a TDRA table, as described above in connection with FIG. 3. In this case, when the base station 110 transmits DCI to the UE 120 to schedule a communication (e.g., an uplink communication or a downlink communication), the base station 110 may include, in the DCI (e.g. in a TDRA field of the DCI), a TDRA index value that indicates a set of TDRA parameters (e.g., corresponding to a row index indicated by the TDRA index value) included in the TDRA table. The UE 120 may transmit or receive (e.g., monitor for) the communication on the cell using the indicated TDRA parameters. For example, the UE 120 may transmit or receive the communication on the cell in a slot indicated by the TDRA index value and for a time period defined by a starting symbol and a length indicated by the TDRA index value.

However, when a single DCI message schedules communications on multiple cells, as shown in FIG. 4, each cell may be associated with (e.g., configured with) a different TDRA table. In this case, the UE 120 may misinterpret a TDRA index value included in the single DCI message, and may select a TDRA that was not intended by the base station 110. This may lead to errors and dropped communications, may increase latency, may reduce reliability, may reduce spectral efficiency (e.g., due to retransmissions), and/or the like.

Some techniques and apparatuses described herein enable a UE 120 to properly interpret a TDRA index value included in a single DCI message that schedules communication in multiple cells, and to apply that TDRA index value to determine a respective TDRA on each of the multiple cells. In this way, communication errors may be reduced, latency may be reduced, reliability may be improved, spectral efficiency may be improved, and/or the like. Furthermore, some techniques and apparatuses described herein enable a single TDRA index value to be applied across multiple cells, thereby reducing signaling overhead.

As indicated above, FIG. 4 is provided as an example. Other examples may differ from what is described with respect to FIG. 4.

Figure 5:
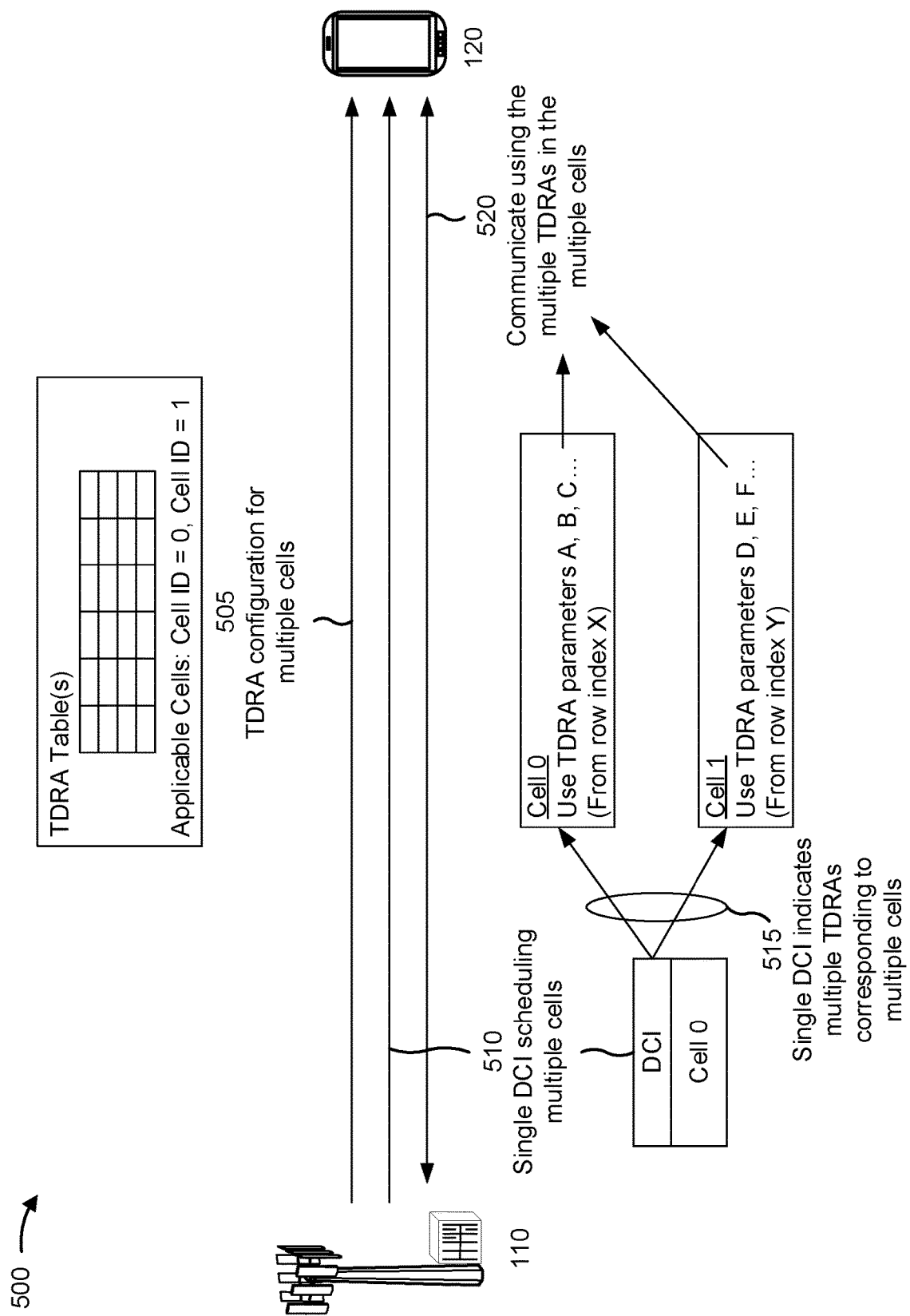
FIGS. 5-10 are diagrams illustrating examples of time domain resource assignment for multiple cells scheduled by a single DCI message, in accordance with the present disclosure.

FIG. 5 is a diagram illustrating an example 500 of time domain resource assignment for multiple cells scheduled by a single DCI message, in accordance with the present disclosure. As shown in FIG. 5, a base station 110 and a UE 120 may communicate with one another.

As shown by reference number 505, the base station 110 may transmit, to the UE 120, a TDRA configuration for multiple cells. For example, the base station 110 may configure one or more TDRA tables for each cell that is configured for the UE 120. In some aspects, the base station 110 may configure a first TDRA table for a first cell (having a cell ID of 0) and may configure a second TDRA table for a second cell (having a cell ID of 1). In some aspects, the base station 110 may configure, for each cell configured for the UE 120, one or more uplink TDRA tables (e.g., one or more PUSCH TDRA tables) for uplink communications on that cell and/or one or more downlink TDRA tables (e.g., one or more PDSCH TDRA tables) for downlink communication on that cell. In some aspects, the TDRA configuration may be included in a configuration message, such as a radio resource control (RRC) message (e.g., an RRC configuration message, an RRC reconfiguration message, and/or the like). In some aspects, the TDRA configuration may be specified according to a wireless communication standard.

As shown by reference number 510, the base station 110 may transmit, to the UE 120, a single DCI message that schedules communications on multiple cells, as described in more detail above in connection with FIG. 4. As shown by reference number 515, the single DCI message may indicate multiple TDRAs corresponding to the multiple cells. Each TDRA, of the multiple TDRAs, may correspond to a different scheduled communication.

In example 500, the single DCI message indicates that a first communication is scheduled on the first cell (Cell 0) according to a first set of TDRA parameter values (shown as A, B, and C), and that a second communication is scheduled on the second cell (Cell 1) according to a second set of TDRA parameter values (shown as D, E, and F). As described in more detail below, the first set of TDRA parameter values may be the same as or different from the second set of TDRA parameter values. As further shown, the first set of TDRA parameters may correspond to a row index of X, and the second set of TDRA parameters may correspond to a row index of Y. As described in more detail below, the row index for the first set of TDRA parameters (e.g., X) may be the same as or different from the row index for the second set of TDRA parameters (e.g., Y). Additional details regarding techniques for indicating the multiple TDRAs are described below in connection with FIGS. 6-10.

As shown by reference number 520, the UE 120 and the base station 110 may communicate with one another using the multiple TDRAs (indicated in the single DCI message) corresponding to the multiple cells. For example, the base station 110 may transmit downlink communications (e.g., PDSCH communications) to the UE 120 using the multiple TDRAs corresponding to the multiple cells, and the UE 120 may monitor for and/or receive the downlink communications using the multiple TDRAs corresponding to the multiple cells. Alternatively, the UE 120 may transmit uplink communications (e.g., PUSCH communications) to the base station 110 using the multiple TDRAs corresponding to the multiple cells, and the base station 110 may monitor for and/or receive the uplink communications using the multiple TDRAs corresponding to the multiple cells.

For example, if the single DCI message includes downlink grants that schedule downlink communications on multiple cells, then the single DCI message may indicate multiple downlink TDRAs corresponding to the multiple cells. For example, the single DCI message may include one or more TDRA index values, which may indicate multiple downlink TDRAs corresponding to the multiple cells. The multiple downlink TDRAs may be indicated in the same downlink TDRA table used across multiple cells, or may be indicated in different downlink TDRA tables used for different cells. The base station 110 may transmit the downlink communications using the indicated downlink TDRAs for respective cells, and the UE 120 may monitor for and/or receive the downlink communications using the indicated downlink TDRAs for respective cells.

As another example, if the single DCI message includes uplink grants that schedule uplink communications on multiple cells, then the single DCI message may indicate multiple uplink TDRAs corresponding to the multiple cells. For example, the single DCI message may include one or more TDRA index values, which may indicate multiple uplink TDRAs corresponding to the multiple cells. The multiple uplink TDRAs may be indicated in the same uplink TDRA table used across multiple cells, or may be indicated in different uplink TDRA tables used for different cells. The base station 110 may transmit the uplink communications using the indicated uplink TDRAs for respective cells, and the UE 120 may monitor for and/or receive the uplink communications using the indicated uplink TDRAs for respective cells.

By enabling an indication of multiple TDRAs, corresponding to multiple cells, in the single DCI message, communication errors may be reduced, latency may be reduced, reliability may be improved, spectral efficiency may be improved, and/or the like. Furthermore, signaling overhead may be reduced according to some techniques described herein. Additional details regarding techniques for indicating the multiple TDRAs are described below in connection with FIGS. 6-10. In some aspects, a first technique described below may be used to indicate multiple TDRAs for downlink communications, and a second (e.g., different) technique described below may be used to indicate multiple TDRAs for uplink communications. In some aspects, the same technique may be used to indicate multiple TDRAs for both downlink communications and uplink communications.

As indicated above, FIG. 5 is provided as an example. Other examples may differ from what is described with respect to FIG. 5.

Figure 6:
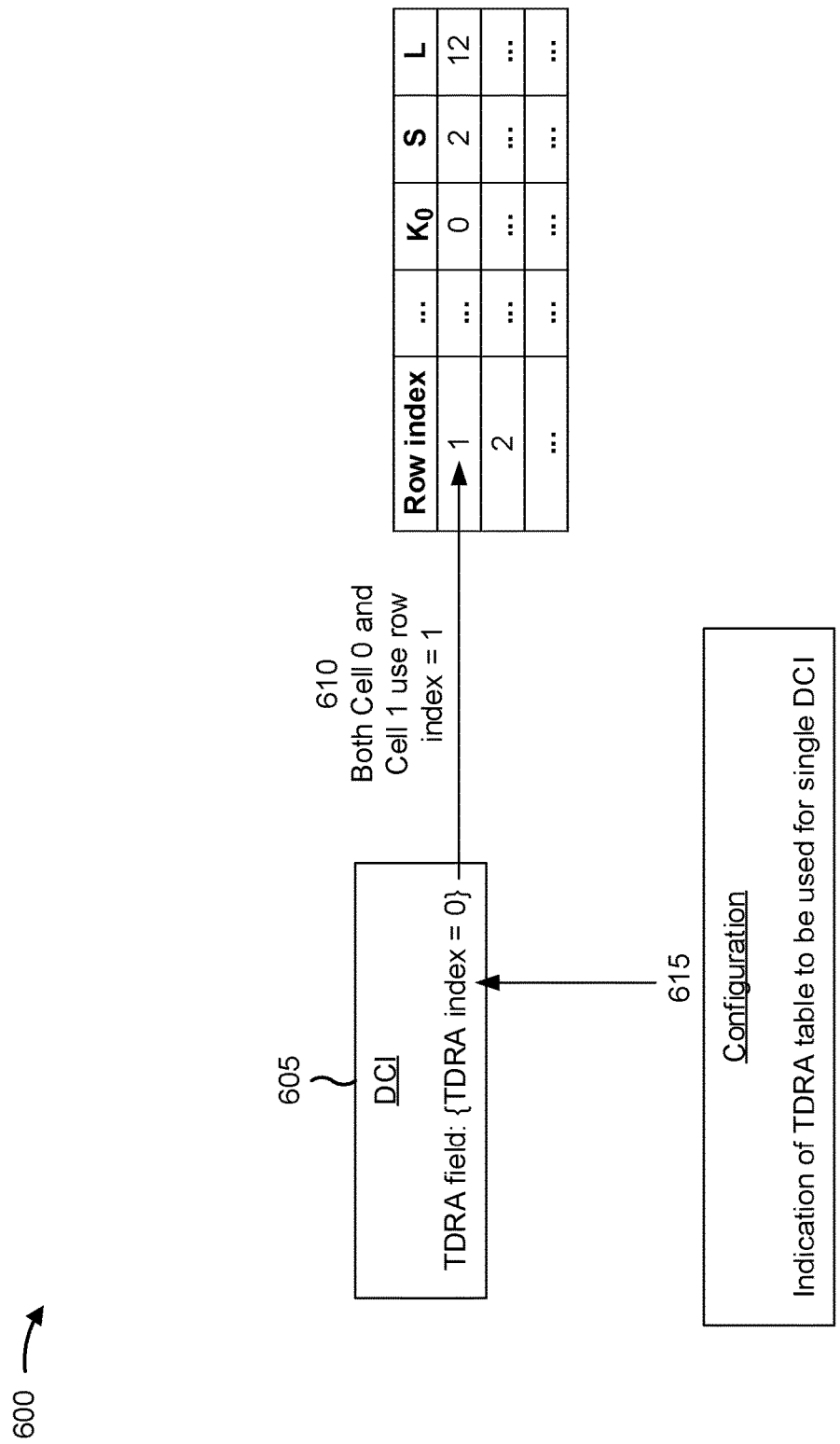

FIG. 6 is a diagram illustrating an example 600 of time domain resource assignment for multiple cells scheduled by a single DCI message, in accordance with the present disclosure.

As shown by reference number 605, in some aspects, the single DCI message includes a single TDRA index value within a single TDRA field. The term "TDRA index value" may refer to a value that indicates or identifies a TDRA to be used for a scheduled communication, as described above in connection with FIG. 3. The term "TDRA field" may refer to a field, in the single DCI message, that includes the TDRA index value, such as a dedicated field of the single DCI message that includes the TDRA index value. The example single DCI message of FIG. 6 includes a single field dedicated to carrying bits of the TDRA index value. By using a single TDRA field and a single TDRA index value, signaling overhead may be reduced and network resources may be conserved.

In example 600, the single TDRA index value indicates a single set of TDRA parameters, in a single TDRA table, that is used for the multiple cells scheduled by the single DCI message. For example, the single TDRA index value (shown as 0) may indicate a single set of TDRA parameters that is used for each cell on which the single DCI message schedules a communication. In some aspects, the single set of TDRA parameters may correspond to a single row index of a single TDRA table. For example, as shown by reference number 610, the single TDRA index value of 0 indicates a row index of 1 in a single TDRA table that is used for both a first cell (Cell 0) and a second cell (Cell 1) scheduled by the single DCI message. In this case, the same row index and the same TDRA table are used for both the first cell and the second cell to identify a set of TDRA parameters that is used for both cells. For example, the PDSCH communications on both the first cell and the second cell may be scheduled according to a $K_0$ value of 0, an S value of 2, and an L value of 12, as shown.

In some aspects, the UE 120 may be configured with different TDRA tables for different cells. For example, the UE 120 may be configured with a first TDRA table for the first cell, and may be configured with a second TDRA table for the second cell. This may lead to misinterpretation of the TDRA index value (e.g., due to misinterpretation of to which TDRA table the TDRA index value is to be applied). To mitigate this issue, the UE 120 may follow a rule to determine a TDRA table to be used in association with the TDRA index value indicated in the single DCI message. The rule may be configured by the base station 110 or may be specified according to a wireless communication standard.

For example, as shown by reference number 615, the base station 110 may transmit, to the UE 120, a configuration (e.g., in an RRC message) that indicates the TDRA table (e.g., the single TDRA table) to be used for single DCI that schedules communications on multiple cells. In some aspects, the base station 110 may configure a TDRA table, for single DCI scheduling of multiple cells, that is different from all of the TDRA tables configured for the cells configured for the UE 120. For example, a TDRA table configured for single DCI scheduling of multiple cells may be dedicated to or used only for a single DCI message that schedules multiple cells, and may not be used for DCI that schedules a single cell (e.g., single DCI scheduling of a single cell).

Alternatively, the base station 110 and/or the UE 120 may use a TDRA table associated with and/or configured for a specific cell that is configured for the UE 120 for single DCI scheduling of multiple cells. In this case, a TDRA table that is configured for a specific cell may be reused for single DCI scheduling of multiple cells, thereby conserving signaling overhead. The specific cell may or may not be included in the multiple cells scheduled by the single DCI message. In some aspects, the specific cell may be a cell via which the single DCI message is received (e.g., a scheduling cell). In some aspects, the specific cell may be a cell, of multiple cells scheduled by the single DCI message, that has a smallest cell identifier or a smallest SCS among all cells of the multiple cells (or that has a smallest cell identifier or a smallest SCS among a set of cells that includes the multiple cells and that includes the scheduling cell). In some aspects, the specific cell may be a cell, of multiple cells scheduled by the single DCI message, that has a largest cell identifier or a largest SCS among all cells of the multiple cells (or that has a largest cell identifier or a largest SCS among a set of cells that includes the multiple cells and that includes the scheduling cell).

As indicated above, FIG. 6 is provided as an example. Other examples may differ from what is described with respect to FIG. 6.

Figure 7:
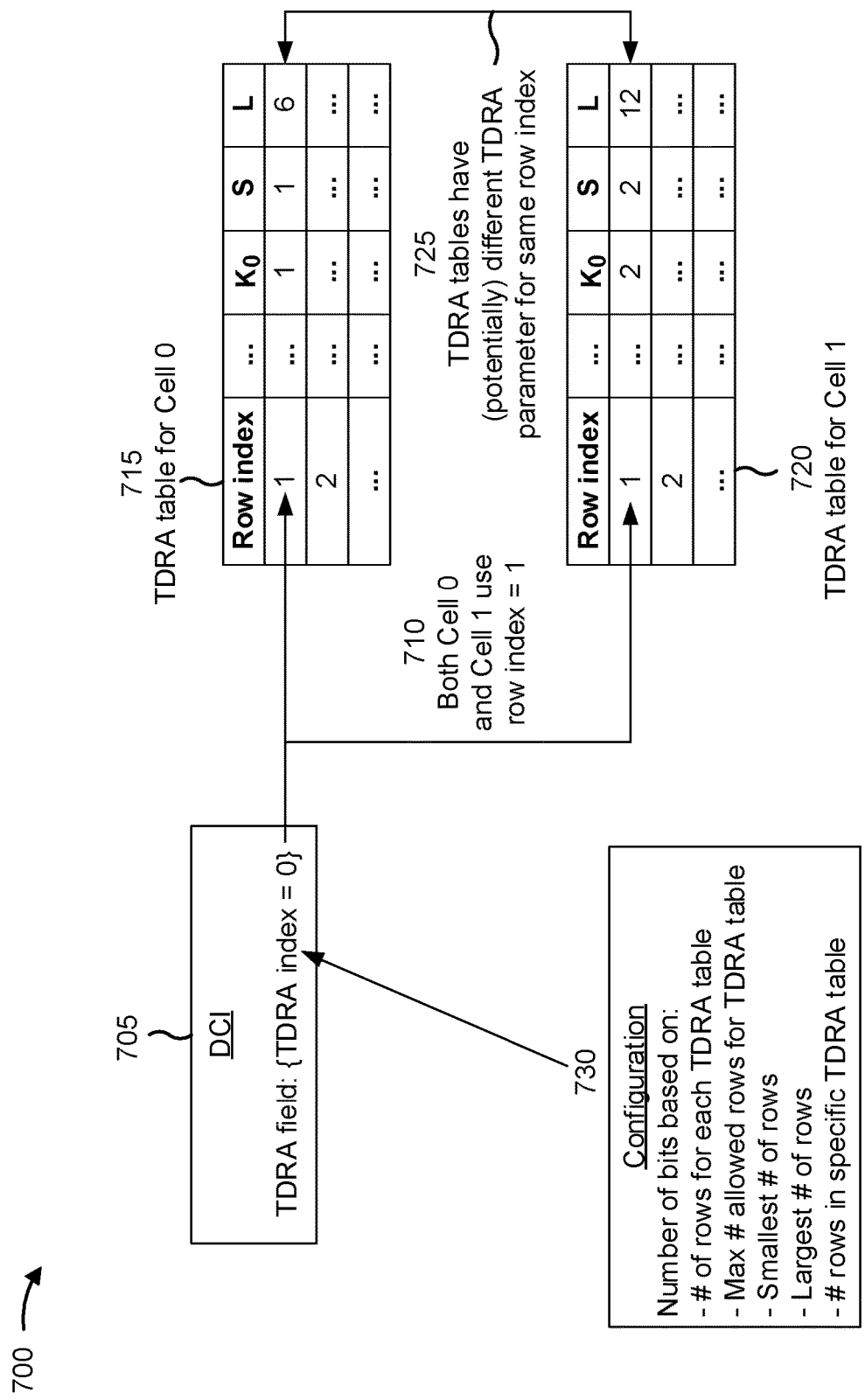

FIG. 7 is a diagram illustrating an example 700 of time domain resource assignment for multiple cells scheduled by a single DCI message, in accordance with the present disclosure.

As shown by reference number 705, in some aspects, the single DCI message includes a single TDRA index value within a single TDRA field. By using a single TDRA field and a single TDRA index value, signaling overhead may be reduced and network resources may be conserved. In example 700, the single TDRA index value indicates multiple sets of TDRA parameters in corresponding multiple TDRA tables. In this case, each set of TDRA parameters, of the multiple sets of TDRA parameters, corresponds to a different cell of the multiple cells scheduled by the single DCI message. In some aspects, the multiple sets of TDRA parameters are associated with a same row index in different TDRA tables.

For example, as shown by reference number 710, a single TDRA index value of 0 may indicate that a row index of 1 is to be used for both a first cell (Cell 0) scheduled by the single DCI message and a second cell (Cell 1) scheduled by the single DCI message. As shown by reference number 715, the first cell may be associated with a first TDRA table (e.g., according to a configuration). As shown by reference number 720, the second cell may be associated with a second (e.g., different) TDRA table (e.g., according to a configuration). As shown by reference number 725, in some aspects, the first TDRA table and the second TDRA table may have different sets of TDRA parameters associated with the same row index. As shown, a row index of 1 in the first TDRA table for the first cell (e.g., having a specific SCS, such as 15 kHz) indicates a $K_0$ value of 1, an S value of 1, and an L value of 6. As further shown, a row index of 1 in the second TDRA table for the second cell (e.g., having an SCS that is twice that of, or some other multiple of, the SCS of the first cell, such as 30 kHz) indicates a $K_0$ value of 2, an S value of 2, and an L value of 12. Thus, the single TDRA index value of 0 may indicate a first set of TDRA parameters (e.g., a $K_0$ value of 1, an S value of 1, and an L value of 6) for the first cell, and may indicate a second set of TDRA parameters (e.g., a $K_0$ value of 2, an S value of 2, and an L value of 12) for the second cell. In this way, communications on different cells having different SCSs may be time-aligned (e.g., with the same start time and the same duration).

In some aspects, the UE 120 may be configured with different TDRA tables for different cells, and those different TDRA tables may have different numbers of rows. For example, the UE 120 may be configured with a first TDRA table, for the first cell that includes a first number of rows, and may be configured with a second TDRA table, for the second cell, that includes a second number of rows. The number of rows may be the same or different in the different TDRA tables. If different TDRA tables have different numbers of rows, this may lead to misinterpretation of the TDRA index value. To mitigate this issue, the UE 120 may follow a rule to determine a number of bits (e.g., a bit length, a bit width, or a bit size) included in the TDRA field (e.g., a number of bits of the TDRA index value). The rule may be configured by the base station 110 or may be specified according to a wireless communication standard.

For example, as shown by reference number 730, the base station 110 may transmit, to the UE 120, a configuration (e.g., in an RRC message) that indicates a number of bits to be included in the single TDRA field (e.g., a bit length, bit width, or bit size of the field). For example, the base station 110 may indicate that the TDRA field is 1 bit in length, is 2 bits in length, is 3 bits in length, or is 4 bits in length, among other examples. Alternatively, the base station 110 may indicate a manner in which the number of bits is to be determined. In some aspects, the number of bits (e.g., the bit length, bit width, or bit size) or the manner in which the number of bits is to be determined may be specified in a wireless communication standard.

In some aspects, the number of bits included in the TDRA field of the single DCI message may be based at least in part on a number of rows in a TDRA configured for a cell (e.g., for any cell) on which a communication is scheduled by the single DCI message. In some aspects, all cells scheduled by the single DCI message may be required to be configured with TDRA tables having the same number of rows (e.g., a same number of rows for a downlink TDRA table for single DCI scheduling downlink communications, or a same number of rows for an uplink TDRA table for single DCI scheduling uplink communications). For example, if all of the multiple cells scheduled by the single DCI message have TDRA tables with 16 rows (sometimes referred to as entries), then the TDRA field may contain four bits. As another example, if all of the multiple cells scheduled by the single DCI message have TDRA tables with 8 rows, then the TDRA field may contain three bits. This reduces the likelihood of ambiguity when scheduling communications on multiple cells.

In some aspects, the number of bits included in the TDRA field of the single DCI message may be based at least in part on a maximum number of rows permitted in a TDRA table. For example, if a maximum of 16 rows are permitted to be included in a TDRA table (e.g., if a TDRA table is not permitted to be configured with more than 16 rows), then the TDRA field may contain four bits.

In some aspects, the number of bits included in the TDRA field of the single DCI message may be based at least in part on a smallest number of rows in a TDRA table configured for a cell, of multiple cells scheduled by the single DCI message, as compared to all other TDRA tables configured for the multiple cells. For example, if a first cell scheduled by the single DCI message is associated with a TDRA table having 16 rows, and a second cell scheduled by the single DCI message is associated with a TDRA table having 8 rows, then the TDRA field may contain three bits (e.g., to indicate 8 possible values, one for each of the rows of the TDRA table of the second cell). This may reduce signaling overhead.

In some aspects, the number of bits included in the TDRA field of the single DCI message may be based at least in part on a largest number of rows in a TDRA table configured for a cell, of multiple cells scheduled by the single DCI message, as compared to all other TDRA tables configured for the multiple cells. For example, if a first cell scheduled by the single DCI message is associated with a TDRA table having 16 rows, and a second cell scheduled by the single DCI message is associated with a TDRA table having 8 rows, then the TDRA field may contain four bits (e.g., to indicate 16 possible values, one for each of the rows of the TDRA table of the first cell). This may increase scheduling flexibility.

In some aspects, the number of bits included in the TDRA field of the single DCI message may be based at least in part on a number of rows in a TDRA table configured for a specific cell. The specific cell may or may not be included in the multiple cells scheduled by the single DCI message. In some aspects, the specific cell may be a cell via which the single DCI message is received (e.g., a scheduling cell). In some aspects, the specific cell may be a cell, of multiple cells scheduled by the single DCI message, that has a smallest cell identifier or a smallest SCS among all cells of the multiple cells (or that has a smallest cell identifier or a smallest SCS among a set of cells that includes the multiple cells and that includes the scheduling cell). In some aspects, the specific cell may be a cell, of multiple cells scheduled by the single DCI message, that has a largest cell identifier or a largest SCS among all cells of the multiple cells (or that has a largest cell identifier or a largest SCS among a set of cells that includes the multiple cells and that includes the scheduling cell).

In some aspects, the single TDRA value included in the single DCI message may correspond to a row index (e.g., a row index value) that is greater than a number of rows in a TDRA table configured for a cell of the multiple cells scheduled by the single DCI message. For example, if a first cell scheduled by the single DCI message is associated with a TDRA table having 16 rows, and a second cell scheduled by the single DCI message is associated with a TDRA table having 8 rows, then the TDRA field may contain four bits to enable an indication of each of the 16 rows of the TDRA table configured for the first cell. However, the second cell does not have 16 rows in the associated TDRA table to correspond to each of the possible values in the TDRA field.

In some aspects, when the single TDRA value corresponds to a row index that is greater than a number of rows in a TDRA table configured for a cell, then the UE 120 and/or the base station 110 may refrain from scheduling a communication on that cell (e.g., may refrain from transmitting or receiving a scheduled communication on that cell). However, in this case, the UE 120 and/or the base station 110 may schedule a communication in a cell for which the TDRA index value is valid.

Alternatively, when the single TDRA value corresponds to a row index that is greater than a number of rows in a TDRA table configured for a cell, then the UE 120 and/or the base station 110 may schedule a communication on that cell (e.g., may transmit or receive a scheduled communication on that cell) using a TDRA that is determined based at least in part on performing a modulo operation using the TDRA index value and a number of rows in a TDRA table configured for that cell. For example, if the TDRA index value is 10 and the number of rows of a TDRA table configured for the cell is 8, then the UE 120 and/or the base station 110 may calculate 10 mod 8=2. The UE 120 and/or the base station 110 may interpret the TDRA index value of 10 as a value of 2, and may identify a TDRA (e.g., a set of TDRA parameters) for the cell corresponding to the value of 2 (e.g., a row index of 2, or a TDRA index value of 2 corresponding to a row index of 3, among other examples).

Alternatively, when the single TDRA value corresponds to a row index that is greater than a number of rows in a TDRA table configured for a cell, then the UE 120 and/or the base station 110 may schedule a communication (e.g., may transmit or receive a scheduled communication) using a specific TDRA (e.g., a specific set of TDRA parameters) for that cell. The specific TDRA may be, for example, a TDRA included in a first row of the TDRA table configured for the cell (e.g., a TDRA indicated by a row index of 1) or a TDRA included in a last row of the TDRA table configured for the cell, among other examples.

As indicated above, FIG. 7 is provided as an example. Other examples may differ from what is described with respect to FIG. 7.

Figure 8:
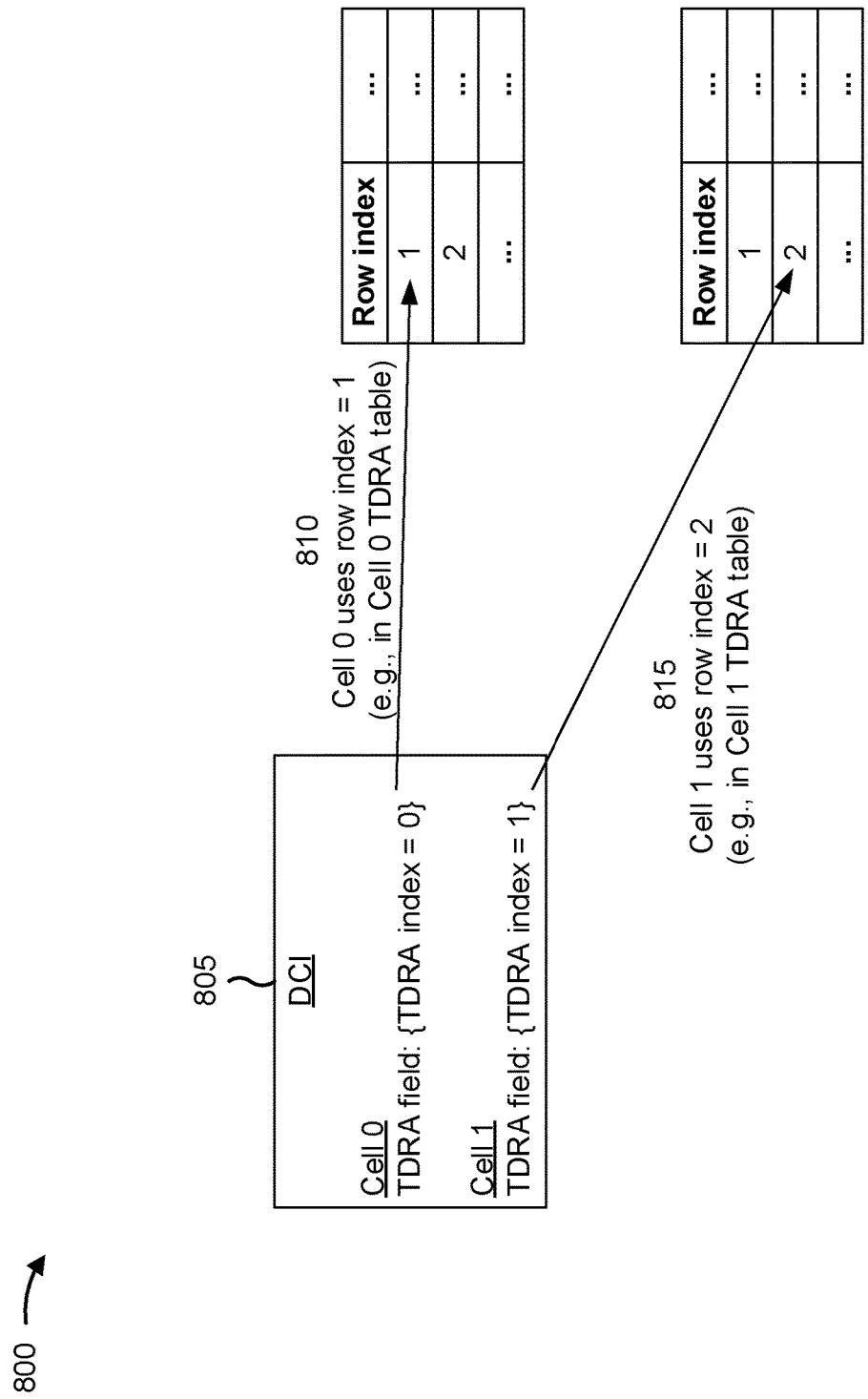

FIG. 8 is a diagram illustrating an example 800 of time domain resource assignment for multiple cells scheduled by a single DCI message, in accordance with the present disclosure.

As shown by reference number 805, in some aspects, the single DCI message includes multiple TDRA index values in corresponding multiple TDRA fields. In this case, each TDRA index value may correspond to a different cell of multiple cells scheduled by the single DCI message. The example single DCI message of FIG. 8 includes multiple fields (e.g., two fields) dedicated to carrying bits of respective TDRA index values. By using multiple TDRA fields and corresponding multiple TDRA index values, scheduling flexibility may be increased.

In example 800, a first TDRA index value, in a first TDRA field associated with a first cell (Cell 0), has a value of 0. As shown by reference number 810, the first TDRA index value of 0 indicates a first set of TDRA parameters for the first cell (Cell 0), which may be associated with a row index of 1 in a TDRA table configured for the first cell. As further shown, a second TDRA index value, in a second TDRA field associated with a second cell (Cell 1), has a value of 1. As shown by reference number 815, the second TDRA index value of 1 indicates a second set of TDRA parameters for the second cell (Cell 1), which may be associated with a row index of 2 in a TDRA table configured for the second cell. In some aspects, the same TDRA table may be configured for different cells. In some aspects, different TDRA tables may be configured for different cells. In some aspects, one or more row indexes of different TDRA tables may be associated with the same set of TDRA parameters. In some aspects, one or more row indexes of different TDRA tables may be associated with different sets of TDRA parameters. In some aspects, a number of bits included in a TDRA field for a cell may be based at least in part on the number of rows of a TDRA table configured for that cell (e.g., 2 bits for four rows, 3 bits for eight rows, or 4 bits for sixteen rows, among other examples).

In some aspects, the size of the single DCI message may be limited. In this case, the single DCI message may include multiple TDRA index values, in corresponding multiple TDRA fields, only if a number of cells scheduled by the single DCI message is less than or equal to a threshold (e.g., two, among other examples). In this way, the size limit of the single DCI message may be satisfied.

As indicated above, FIG. 8 is provided as an example. Other examples may differ from what is described with respect to FIG. 8.

Figure 9:
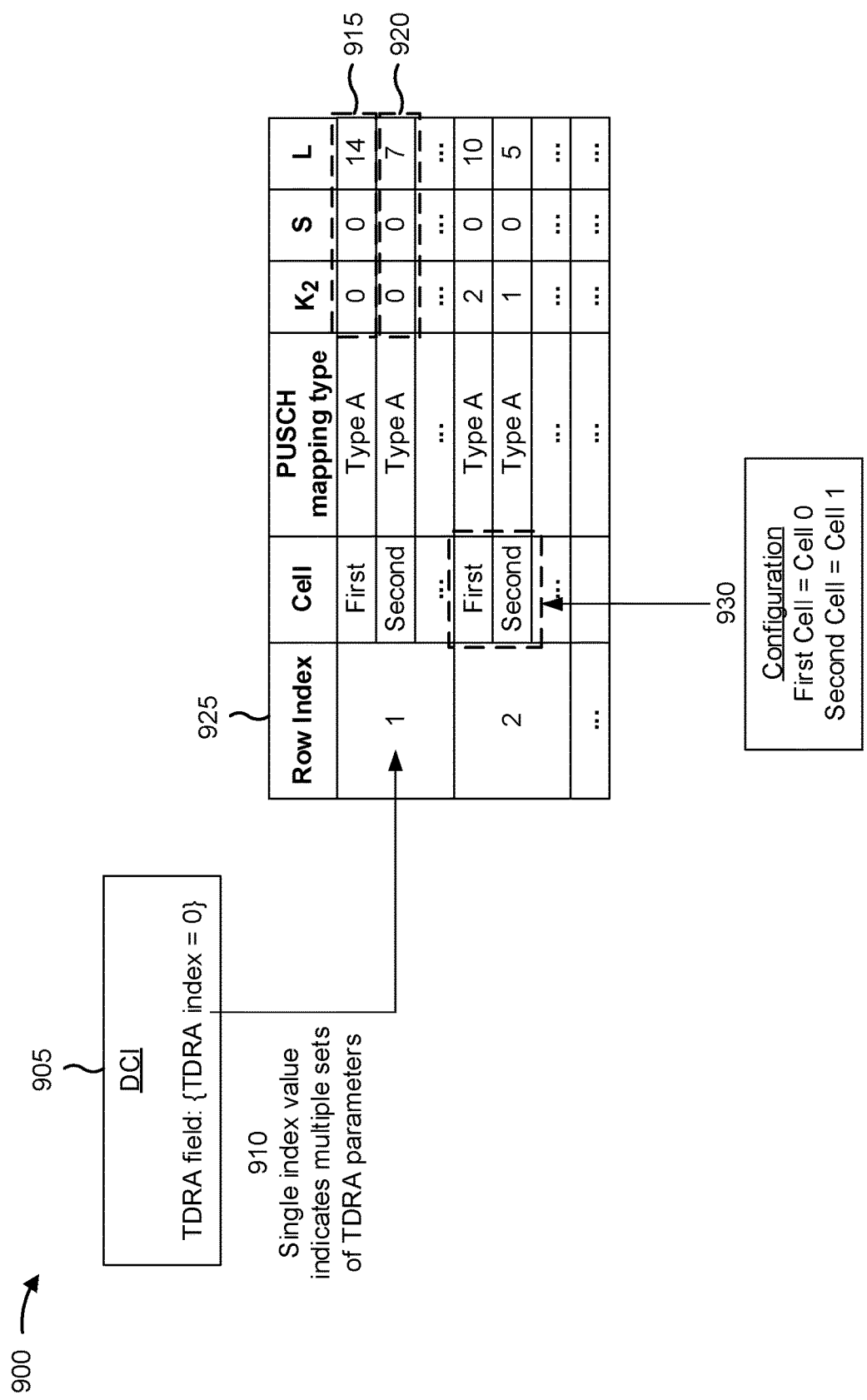

FIG. 9 is a diagram illustrating an example 900 of time domain resource assignment for multiple cells scheduled by a single DCI message, in accordance with the present disclosure.

As shown by reference number 905, in some aspects, the single DCI message may include a single TDRA index value within a single TDRA field, which may conserve signaling overhead and may conserve network resources. In example 900, the single TDRA index value indicates multiple sets of TDRA parameters associated with a single row index of a single TDRA table. Each set of TDRA parameters, of the multiple sets of TDRA parameters, may correspond to a different cell of the multiple cells scheduled by the single DCI message. For example, as shown by reference number 910, the single TDRA index value (shown as 0) may indicate a first set of TDRA parameters 915 (e.g., a $K_2$ value of 0, an S value of 0, and an L value of 14) for a first scheduled cell (e.g., Cell 0) and may also indicate a second set of TDRA parameters 920 (e.g., a $K_2$ value of 0, an S value of 0, and an L value of 7) for a second scheduled cell (e.g., Cell 1). The first set of TDRA parameters and the second set of TDRA parameters may be included in a single TDRA table 925. In some aspects, the number of bits in the TDRA field is based at least in part on the number of rows in the single TDRA table 925.

As shown by reference number 930, the base station 110 may transmit, to the UE 120, a configuration (e.g., in an RRC message) that indicates a mapping of scheduled cells and sets of TDRA parameters. In example 900, the base station 110 indicates that a first set of TDRA parameters associated with a row index (shown as TDRA parameters associated with the "First" cell in the TDRA table 925) is mapped to Cell 0, and that a second set of TDRA parameters associated with the row index (shown as TDRA parameters associated with the "Second" cell in the TDRA table 925) is mapped to Cell 1. In some aspects, rather than mapping sets of TDRA parameters associated with the same row index to specific cells, the configuration may indicate a mapping that is based at least in part on cell identifiers of the scheduled cells. For example, a cell with the lowest cell identifier may be mapped to the first set of TDRA parameters associated with a row index, a cell with the next-lowest cell identifier (or highest cell identifier, in the case of two scheduled cells) may be mapped to the second set of TDRA parameters associated with the row index, and so on. In some aspects, the mapping may be specified in a wireless communication standard. This may enable increased scheduling flexibility while also reducing signaling overhead.

As indicated above, FIG. 9 is provided as an example. Other examples may differ from what is described with respect to FIG. 9.

Figure 10:
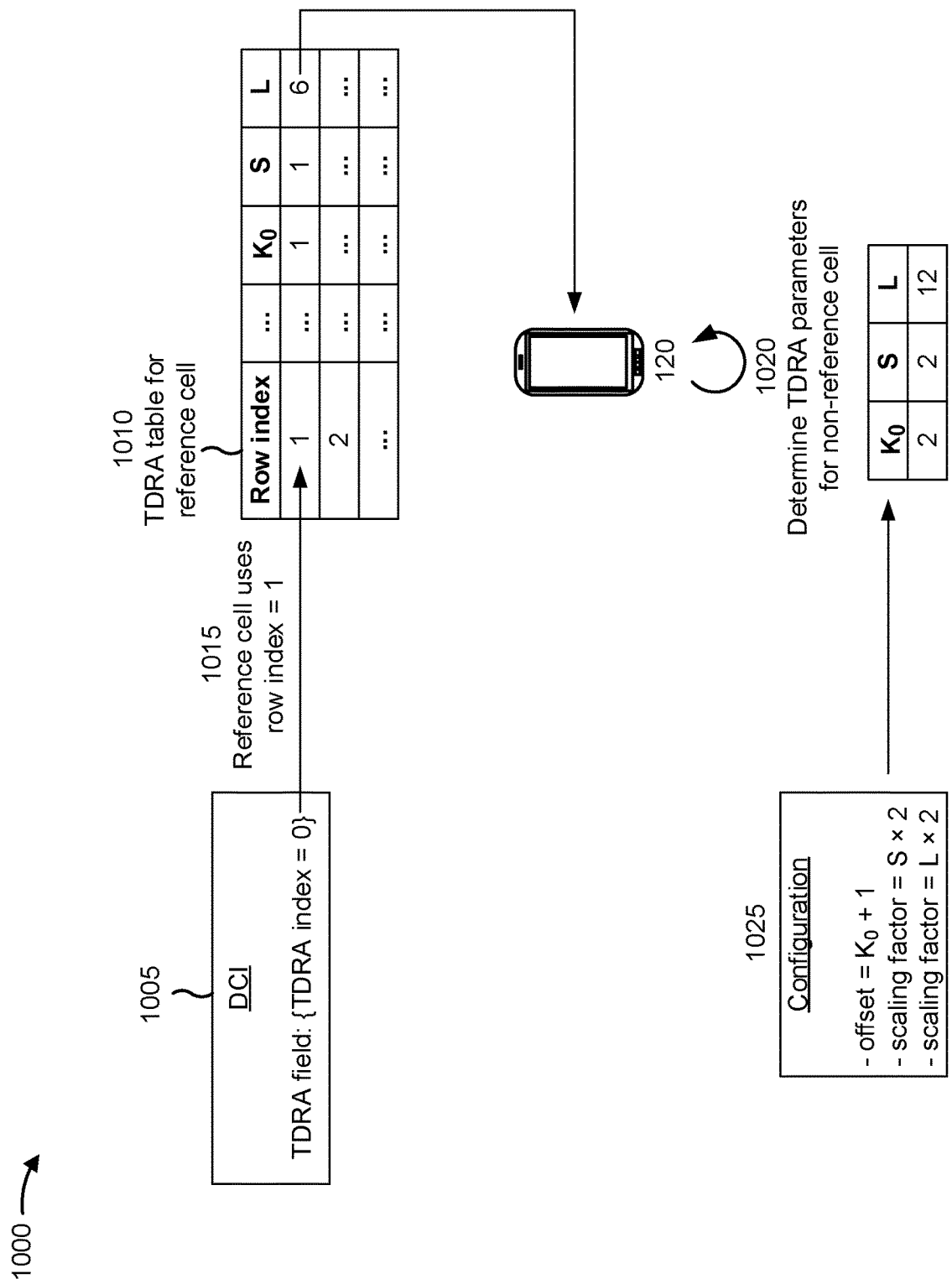

FIG. 10 is a diagram illustrating an example 1000 of time domain resource assignment for multiple cells scheduled by a single DCI message, in accordance with the present disclosure.

As shown by reference number 1005, in some aspects, the single DCI message includes a single TDRA index value within a single TDRA field, which may reduce signaling overhead and may conserve network resources. In example 1000, the single TDRA index value indicates a single set of TDRA parameters, in a single TDRA table, that is used for a reference cell. In some aspects, the single set of TDRA parameters may correspond to a single row index of a single TDRA table 1010. The single TDRA table 1010 may be a TDRA table that is configured for the reference cell. For example, as shown by reference number 1015, a single TDRA index value of 0 indicates a row index of 1 in the single TDRA table 1010 that is configured for a reference cell. For example, the communications on the reference cell may be scheduled according to a $K_0$ value of 1, an S value of 1, and an L value of 6, as shown.

The reference cell may or may not be included in the multiple cells scheduled by the single DCI message. In some aspects, the reference cell may be a cell via which the single DCI message is received (e.g., a scheduling cell). In some aspects, the reference cell may be a cell, of multiple cells scheduled by the single DCI message, that has a smallest cell identifier or a smallest SCS among all cells of the multiple cells (or that has a smallest cell identifier or a smallest SCS among a set of cells that includes the multiple cells and that includes the scheduling cell). In some aspects, the reference cell may be a cell, of multiple cells scheduled by the single DCI message, that has a largest cell identifier or a largest SCS among all cells of the multiple cells (or that has a largest cell identifier or a largest SCS among a set of cells that includes the multiple cells and that includes the scheduling cell). In some aspects, the reference cell may be configured by the base station 110. In some aspects, the reference cell may be specified according to a wireless communication standard.

As shown by reference number 1020, the UE 120 (and/or the base station 110) may determine a set of TDRA parameters for a cell, of the multiple cells scheduled by the single DCI message, other than the reference cell. For example, the UE 120 (and/or the base station 110) may determine the set of TDRA parameters for a scheduled cell other than the reference cell (e.g., for a non-reference cell) based at least in part on performing a calculation using one or more modification parameters and the single set of TDRA parameters determined for the reference cell. The calculation may include, for example, applying an offset to a parameter of the single set of TDRA parameters (e.g., applying an offset of 1 to a $K_0$ value of 1 for the reference cell to determine a $K_0$ value of 2 for the non-reference cell, among other examples), applying a scaling factor to a parameter of the single set of TDRA parameters (e.g., applying a scaling factor of 2 to an S value of 1 for the reference cell to determine an S value of 2 for the non-reference cell, or applying a scaling factor of 2 to an L value of 6 for the reference cell to determine an L value of 12 for the non-reference cell, among other examples), and/or the like.

As shown by reference number 1025, in some aspects, the one or more modification parameters (e.g., an offset, a scaling factor, and/or the like) may be indicated in a configuration from the base station 110. In some aspects, the one or more modification parameters may be specified according to a wireless communication standard. In this way, signaling overhead may be reduced while also enabling scheduling flexibility.

As indicated above, FIG. 10 is provided as an example. Other examples may differ from what is described with respect to FIG. 10.

Figure 11:
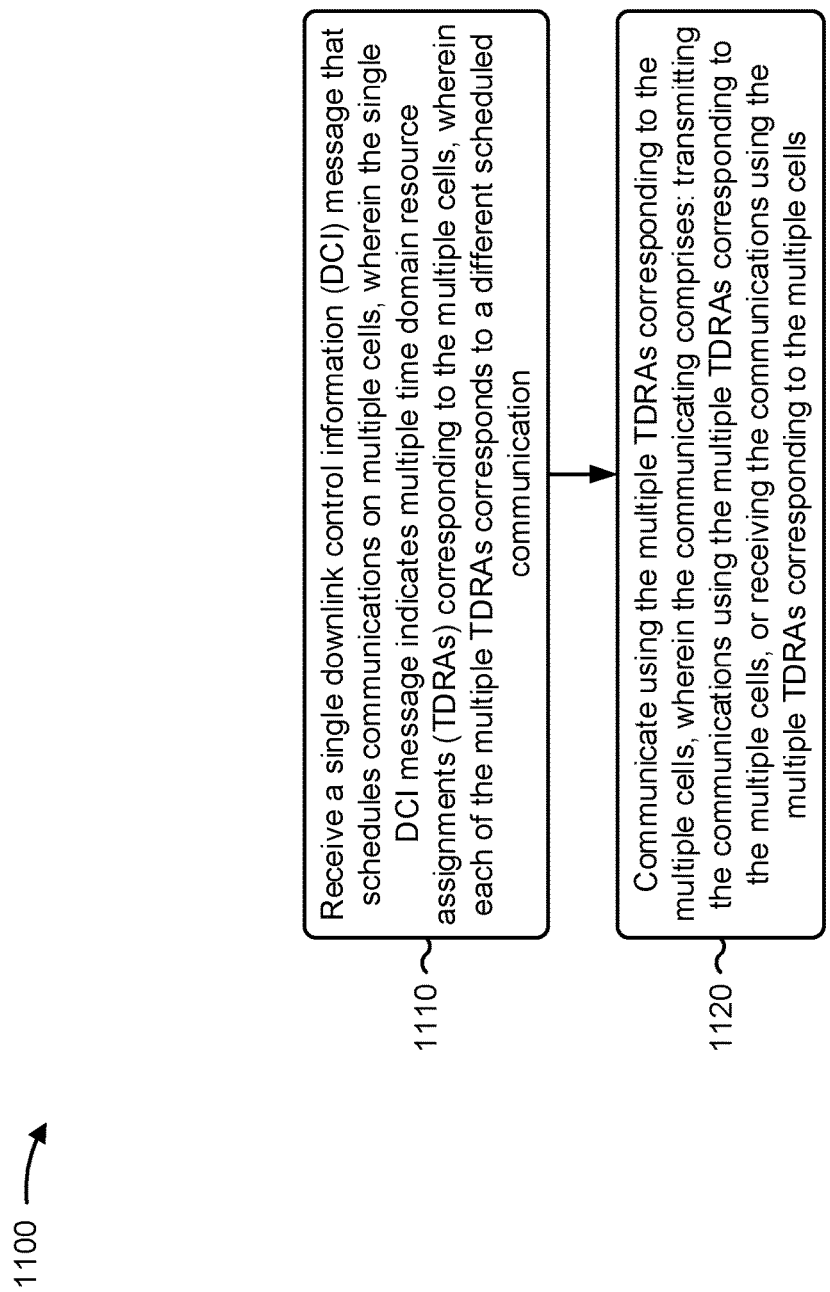
FIG. 11 is a diagram illustrating an example process performed, for example, by a user equipment, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with time domain resource assignment for multiple cells scheduled by a single DCI message.

As shown in FIG. 11, in some aspects, process 1100 may include receiving a single DCI message that schedules communications on multiple cells, wherein the single DCI message indicates multiple TDRAs corresponding to the multiple cells, wherein each of the multiple TDRAs corresponds to a different scheduled communication (block 1110). For example, the UE (e.g., using receive processor 258, controller/processor 280, memory 282, and/or the like) may receive a single DCI message that schedules communications on multiple cells, as described above. In some aspects, the single DCI message indicates multiple TDRAs corresponding to the multiple cells. In some aspects, each of the multiple TDRAs corresponds to a different scheduled communication.

As further shown in FIG. 11, in some aspects, process 1100 may include communicating using the multiple TDRAs corresponding to the multiple cells, wherein the communicating comprises: transmitting the communications using the multiple TDRAs corresponding to the multiple cells, or receiving the communications using the multiple TDRAs corresponding to the multiple cells (block 1120). For example, the UE (e.g., using receive processor 258, transmit processor 264, controller/processor 280, memory 282, and/or the like) may communicate using the multiple TDRAs corresponding to the multiple cells, as described above. In some aspects, the communicating comprises transmitting the communications using the multiple TDRAs corresponding to the multiple cells. In some aspects, the communicating comprises receiving the communications using the multiple TDRAs corresponding to the multiple cells Process 1100 may include additional aspects, such as any single aspect or any combination of aspects described below and/or in connection with one or more other processes described elsewhere herein.

In a first aspect, the communications are downlink communications, the multiple TDRAs are multiple downlink TDRAs, and the communicating comprises receiving the downlink communications using the multiple TDRAs corresponding to the multiple cells.

In a second aspect, alone or in combination with the first aspect, the communications are uplink communications, the multiple TDRAs are multiple uplink TDRAs, and the communicating comprises transmitting the uplink communications using the multiple TDRAs corresponding to the multiple cells.

In a third aspect, alone or in combination with one or more of the first and second aspects, the single DCI message includes a single TDRA index value within a single TDRA field, and the single TDRA index value indicates a single set of TDRA parameters, in a single TDRA table, that is to be used for all of the multiple cells.

In a fourth aspect, alone or in combination with one or more of the first through third aspects, process 1100 includes receiving a configuration that indicates the single TDRA table to be used for single DCI scheduling of multiple cells.

In a fifth aspect, alone or in combination with one or more of the first through fourth aspects, the single TDRA table is different from all TDRA tables configured for the multiple cells.

In a sixth aspect, alone or in combination with one or more of the first through fifth aspects, the single TDRA table is a TDRA table associated with: a cell on which the single DCI message is received; a cell, of the multiple cells, that has a smallest cell identifier among all cells of the multiple cells; a cell, of the multiple cells, that has a largest cell identifier among all cells of the multiple cells; a cell, of the multiple cells, that has a smallest sub-carrier spacing among all cells of the multiple cells; or a cell, of the multiple cells, that has a largest sub-carrier spacing among all cells of the multiple cells.

In a seventh aspect, alone or in combination with one or more of the first through sixth aspects, the single DCI message includes a single TDRA index value within a single TDRA field, the single TDRA index value indicates multiple sets of TDRA parameters in corresponding multiple TDRA tables, and each set of TDRA parameters corresponds to a different cell of the multiple cells.

In an eighth aspect, alone or in combination with one or more of the first through seventh aspects, the multiple sets of TDRA parameters are associated with a same row index in different TDRA tables.

In a ninth aspect, alone or in combination with one or more of the first through eighth aspects, a number of bits included in the single TDRA field is based at least in part on a number of rows in a TDRA table of the multiple TDRA tables, and all TDRA tables of the multiple TDRA tables include a same number of rows.

In a tenth aspect, alone or in combination with one or more of the first through ninth aspects, a number of bits included in the single TDRA field is based at least in part on a maximum number of rows permitted in a TDRA table of the multiple TDRA tables.

In an eleventh aspect, alone or in combination with one or more of the first through tenth aspects, a number of bits included in the single TDRA field is based at least in part on a smallest number of rows in a TDRA table compared to all other TDRA tables configured for the multiple cells.

In a twelfth aspect, alone or in combination with one or more of the first through eleventh aspects, a number of bits included in the single TDRA field is based at least in part on a largest number of rows in a TDRA table compared to all other TDRA tables configured for the multiple cells.

In a thirteenth aspect, alone or in combination with one or more of the first through twelfth aspects, a number of bits included in the single TDRA field is based at least in part on a number of rows in a TDRA table associated with a specific cell.

In a fourteenth aspect, alone or in combination with one or more of the first through thirteenth aspects, the specific cell is: a cell on which the single DCI message is received; a cell, of the multiple cells, that has a smallest cell identifier among all cells of the multiple cells; a cell, of the multiple cells, that has a largest cell identifier among all cells of the multiple cells; a cell, of the multiple cells, that has a smallest sub-carrier spacing among all cells of the multiple cells; or a cell, of the multiple cells, that has a largest sub-carrier spacing among all cells of the multiple cells.

In a fifteenth aspect, alone or in combination with one or more of the first through fourteenth aspects, the single TDRA index value corresponds to a row index that is greater than a number of rows in a TDRA table associated with a cell of the multiple cells.

In a sixteenth aspect, alone or in combination with one or more of the first through fifteenth aspects, the UE is configured to refrain from scheduling a communication, of the communications scheduled by the single DCI message, in the cell based at least in part on a determination that the single TDRA index value corresponds to a row index that is greater than the number of rows in the TDRA table associated with the cell.

In a seventeenth aspect, alone or in combination with one or more of the first through sixteenth aspects, the UE is configured to schedule a communication, of the communications scheduled by the single DCI message, using a TDRA for the cell based at least in part on a determination that the single TDRA index value corresponds to a row index that is greater than the number of rows in the TDRA table associated with the cell, and the TDRA is determined based at least in part on performing a modulo operation using the single TDRA index value and the number of rows in the TDRA table associated with the cell.

In an eighteenth aspect, alone or in combination with one or more of the first through seventeenth aspects, the UE is configured to schedule a communication, of the communications scheduled by the single DCI message, using a specific TDRA for the cell based at least in part on a determination that the single TDRA index value corresponds to a row index that is greater than the number of rows in the TDRA table associated with the cell.

In a nineteenth aspect, alone or in combination with one or more of the first through eighteenth aspects, the specific TDRA corresponds to a first row of the TDRA table or a last row of the TDRA table.

In a twentieth aspect, alone or in combination with one or more of the first through nineteenth aspects, a number of bits included in the single TDRA field is based at least in part on at least one of: a number of rows in a TDRA table of the multiple TDRA tables, wherein all TDRA tables of the multiple TDRA tables include a same number of rows, a maximum number of rows permitted in a TDRA table of the multiple TDRA tables, a smallest number of rows in a TDRA table compared to all other TDRA tables configured for the multiple cells, a largest number of rows in a TDRA table compared to all other TDRA tables configured for the multiple cells, or a number of rows in a TDRA table associated with a specific cell.

In a twenty-first aspect, alone or in combination with one or more of the first through twentieth aspects, the single DCI message includes multiple TDRA index values in corresponding multiple TDRA fields, and each TDRA index value corresponds to a different cell of the multiple cells.

In a twenty-second aspect, alone or in combination with one or more of the first through twenty-first aspects, a number of cells, included in the multiple cells, is less than or equal to a threshold.

In a twenty-third aspect, alone or in combination with one or more of the first through twenty-second aspects, the single DCI message includes a single TDRA index value within a single TDRA field, the single TDRA index value indicates multiple sets of TDRA parameters associated with a single row index of a single TDRA table, and each set of TDRA parameters corresponds to a different cell of the multiple cells.

In a twenty-fourth aspect, alone or in combination with one or more of the first through twenty-third aspects, process 1100 includes receiving a configuration that indicates a mapping between the multiple cells and the multiple sets of TDRA parameters.

In a twenty-fifth aspect, alone or in combination with one or more of the first through twenty-fourth aspects, process 1100 includes determining a mapping between the multiple cells and the multiple sets of TDRA parameters based at least in part on cell identifiers of the multiple cells.

In a twenty-sixth aspect, alone or in combination with one or more of the first through twenty-fifth aspects, the single DCI message includes a single TDRA index value within a single TDRA field, and the single TDRA index value indicates a single set of TDRA parameters, in a single TDRA table, that is to be used for a reference cell of the multiple cells.

In a twenty-seventh aspect, alone or in combination with one or more of the first through twenty-sixth aspects, the reference cell is: a cell on which the single DCI message is received; a cell, of the multiple cells, that has a smallest cell identifier among all cells of the multiple cells; a cell, of the multiple cells, that has a largest cell identifier among all cells of the multiple cells; a cell, of the multiple cells, that has a smallest sub-carrier spacing among all cells of the multiple cells; or a cell, of the multiple cells, that has a largest sub-carrier spacing among all cells of the multiple cells.

In a twenty-eighth aspect, alone or in combination with one or more of the first through twenty-seventh aspects, process 1100 includes determining a set of TDRA parameters for a cell, of the multiple cells, other than the reference cell, based at least in part on performing a calculation using one or more modification parameters and the single set of TDRA parameters.

In a twenty-ninth aspect, alone or in combination with one or more of the first through twenty-eighth aspects, the calculation includes at least one of applying an offset to a parameter of the single set of TDRA parameters, applying a scaling factor to a parameter of the single set of TDRA parameters, or a combination thereof.

In a thirtieth aspect, alone or in combination with one or more of the first through twenty-ninth aspects, process 1100 includes receiving a configuration that indicates the one or more modification parameters.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
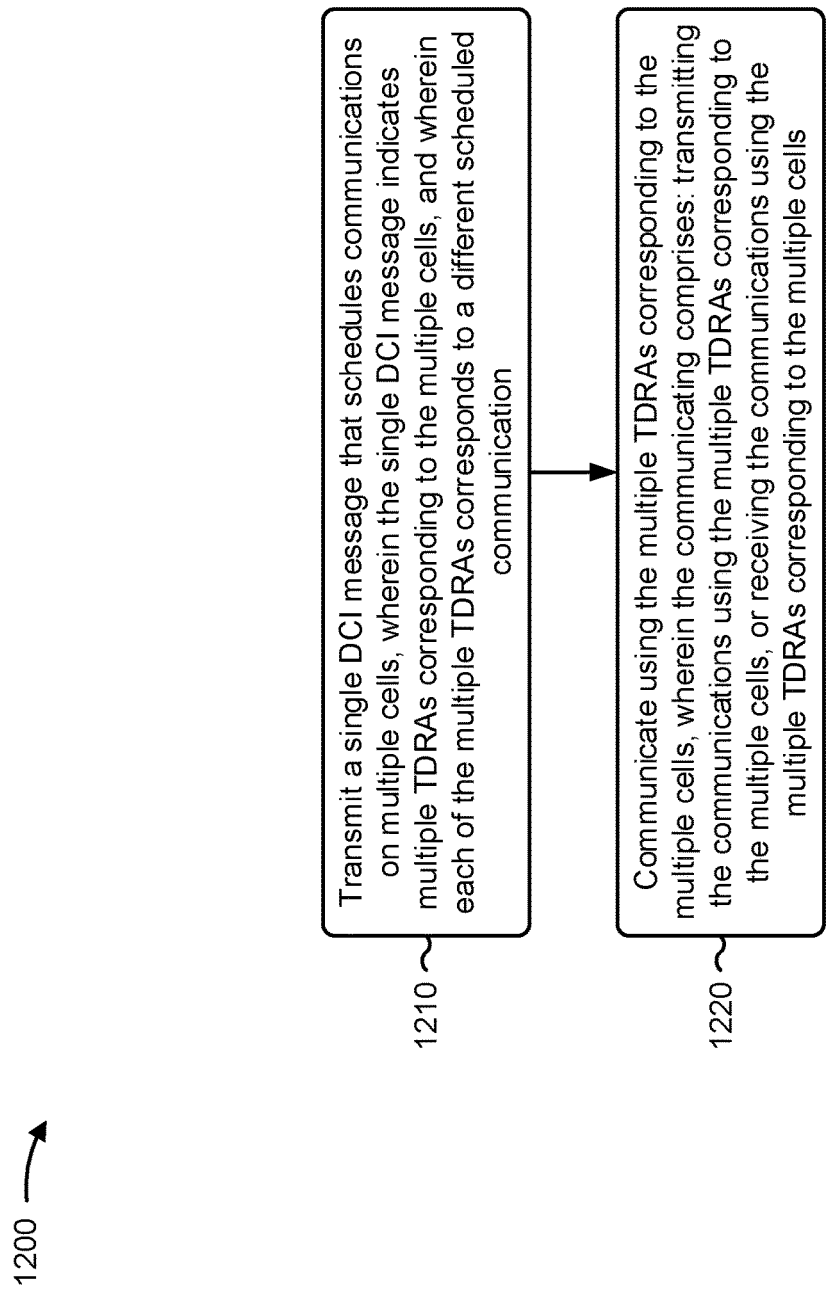
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., base station 110) performs operations associated with time domain resource assignment for multiple cells scheduled by a single DCI message.

As shown in FIG. 12, in some aspects, process 1200 may include transmitting a single DCI message that schedules communications on multiple cells, wherein the single DCI message indicates multiple TDRAs corresponding to the multiple cells, and wherein each of the multiple TDRAs corresponds to a different scheduled communication (block 1210). For example, the base station (e.g., using transmit processor 220, controller/processor 240, memory 242, and/or the like) may transmit a single DCI message that schedules communications on multiple cells, as described above. In some aspects, the single DCI message indicates multiple TDRAs corresponding to the multiple cells. In some aspects, each of the multiple TDRAs corresponds to a different scheduled communication.

As further shown in FIG. 12, in some aspects, process 1200 may include communicating using the multiple TDRAs corresponding to the multiple cells, wherein the communicating comprises: transmitting the communications using the multiple TDRAs corresponding to the multiple cells, or receiving the communications using the multiple TDRAs corresponding to the multiple cells (block 1220). For example, the base station (e.g., using transmit processor 220, receive processor 238, controller/processor 240, memory 242, and/or the like) may communicate using the multiple TDRAs corresponding to the multiple cells, as described above. In some aspects, the communicating comprises transmitting the communications using the multiple TDRAs corresponding to the multiple cells. In some aspects, the communicating comprises receiving the communications using the multiple TDRAs corresponding to the multiple cells.

Process 1200 may include additional aspects, such as any single aspect or any combination of aspects described below and/or in connection with one or more other processes described elsewhere herein.

In a first aspect, the communications are downlink communications, the multiple TDRAs are multiple downlink TDRAs, and the communicating comprises transmitting the downlink communications using the multiple TDRAs corresponding to the multiple cells.

In a second aspect, alone or in combination with the first aspect, the communications are uplink communications, the multiple TDRAs are multiple uplink TDRAs, and the communicating comprises receiving the uplink communications using the multiple TDRAs corresponding to the multiple cells.

In a third aspect, alone or in combination with one or more of the first and second aspects, the single DCI message includes a single TDRA index value within a single TDRA field, and the single TDRA index value indicates a single set of TDRA parameters, in a single TDRA table, that is to be used for all of the multiple cells.

In a fourth aspect, alone or in combination with one or more of the first through third aspects, process 1200 includes transmitting a configuration that indicates the single TDRA table to be used for single DCI scheduling of multiple cells.

In a fifth aspect, alone or in combination with one or more of the first through fourth aspects, the single TDRA table is different from all TDRA tables configured for the multiple cells.

In a sixth aspect, alone or in combination with one or more of the first through fifth aspects, the single TDRA table is a TDRA table associated with: a cell on which the single DCI message is transmitted; a cell, of the multiple cells, that has a smallest cell identifier among all cells of the multiple cells; a cell, of the multiple cells, that has a largest cell identifier among all cells of the multiple cells; a cell, of the multiple cells, that has a smallest sub-carrier spacing among all cells of the multiple cells; or a cell, of the multiple cells, that has a largest sub-carrier spacing among all cells of the multiple cells.

In a seventh aspect, alone or in combination with one or more of the first through sixth aspects, the single DCI message includes a single TDRA index value within a single TDRA field, and the single TDRA index value indicates multiple sets of TDRA parameters in corresponding multiple TDRA tables, each set of TDRA parameters corresponds to a different cell of the multiple cells.

In an eighth aspect, alone or in combination with one or more of the first through seventh aspects, the multiple sets of TDRA parameters are associated with a same row index in different TDRA tables.

In a ninth aspect, alone or in combination with one or more of the first through eighth aspects, a number of bits included in the single TDRA field is based at least in part on a number of rows in a TDRA table of the multiple TDRA tables, and all TDRA tables of the multiple TDRA tables include a same number of rows.

In a tenth aspect, alone or in combination with one or more of the first through ninth aspects, a number of bits included in the single TDRA field is based at least in part on a maximum number of rows permitted in a TDRA table of the multiple TDRA tables.

In an eleventh aspect, alone or in combination with one or more of the first through tenth aspects, a number of bits included in the single TDRA field is based at least in part on a smallest number of rows in a TDRA table compared to all other TDRA tables configured for the multiple cells.

In a twelfth aspect, alone or in combination with one or more of the first through eleventh aspects, a number of bits included in the single TDRA field is based at least in part on a largest number of rows in a TDRA table compared to all other TDRA tables configured for the multiple cells.

In a thirteenth aspect, alone or in combination with one or more of the first through twelfth aspects, a number of bits included in the single TDRA field is based at least in part on a number of rows in a TDRA table associated with a specific cell.

In a fourteenth aspect, alone or in combination with one or more of the first through thirteenth aspects, the specific cell is: a cell on which the single DCI message is transmitted; a cell, of the multiple cells, that has a smallest cell identifier among all cells of the multiple cells; a cell, of the multiple cells, that has a largest cell identifier among all cells of the multiple cells; a cell, of the multiple cells, that has a smallest sub-carrier spacing among all cells of the multiple cells; or a cell, of the multiple cells, that has a largest sub-carrier spacing among all cells of the multiple cells.

In a fifteenth aspect, alone or in combination with one or more of the first through fourteenth aspects, the single TDRA index value corresponds to a row index that is greater than a number of rows in a TDRA table associated with a cell of the multiple cells.

In a sixteenth aspect, alone or in combination with one or more of the first through fifteenth aspects, the base station is configured to refrain from scheduling a communication, of the communications scheduled by the single DCI message, in the cell based at least in part on a determination that the single TDRA index value corresponds to a row index that is greater than the number of rows in the TDRA table associated with the cell.

In a seventeenth aspect, alone or in combination with one or more of the first through sixteenth aspects, the base station is configured to schedule a communication, of the communications scheduled by the single DCI message, using a TDRA for the cell based at least in part on a determination that the single TDRA index value corresponds to a row index that is greater than the number of rows in the TDRA table associated with the cell, and the TDRA is determined based at least in part on performing a modulo operation using the single TDRA index value and the number of rows in the TDRA table associated with the cell.

In an eighteenth aspect, alone or in combination with one or more of the first through seventeenth aspects, the base station is configured to schedule a communication, of the communications scheduled by the single DCI message, using a specific TDRA for the cell based at least in part on a determination that the single TDRA index value corresponds to a row index that is greater than the number of rows in the TDRA table associated with the cell.

In a nineteenth aspect, alone or in combination with one or more of the first through eighteenth aspects, the specific TDRA corresponds to a first row of the TDRA table or a last row of the TDRA table.

In a twentieth aspect, alone or in combination with one or more of the first through nineteenth aspects, a number of bits included in the single TDRA field is based at least in part on at least one of: a number of rows in a TDRA table of the multiple TDRA tables, wherein all TDRA tables of the multiple TDRA tables include a same number of rows, a maximum number of rows permitted in a TDRA table of the multiple TDRA tables, a smallest number of rows in a TDRA table compared to all other TDRA tables configured for the multiple cells, a largest number of rows in a TDRA table compared to all other TDRA tables configured for the multiple cells, or a number of rows in a TDRA table associated with a specific cell.

In a twenty-first aspect, alone or in combination with one or more of the first through twentieth aspects, the single DCI message includes multiple TDRA index values in corresponding multiple TDRA fields, and each TDRA index value corresponds to a different cell of the multiple cells.

In a twenty-second aspect, alone or in combination with one or more of the first through twenty-first aspects, a number of cells, included in the multiple cells, is less than or equal to a threshold.

In a twenty-third aspect, alone or in combination with one or more of the first through twenty-second aspects, the single DCI message includes a single TDRA index value within a single TDRA field, the single TDRA index value indicates multiple sets of TDRA parameters associated with a single row index of a single TDRA table, and each set of TDRA parameters corresponds to a different cell of the multiple cells.

In a twenty-fourth aspect, alone or in combination with one or more of the first through twenty-third aspects, process 1200 includes transmitting a configuration that indicates a mapping between the multiple cells and the multiple sets of TDRA parameters.

In a twenty-fifth aspect, alone or in combination with one or more of the first through twenty-fourth aspects, process 1200 includes determining a mapping between the multiple cells and the multiple sets of TDRA parameters based at least in part on cell identifiers of the multiple cells.

In a twenty-sixth aspect, alone or in combination with one or more of the first through twenty-fifth aspects, the single DCI message includes a single TDRA index value within a single TDRA field, and the single TDRA index value indicates a single set of TDRA parameters, in a single TDRA table, that is to be used for a reference cell of the multiple cells.

In a twenty-seventh aspect, alone or in combination with one or more of the first through twenty-sixth aspects, the reference cell is: a cell on which the single DCI message is transmitted; a cell, of the multiple cells, that has a smallest cell identifier among all cells of the multiple cells; a cell, of the multiple cells, that has a largest cell identifier among all cells of the multiple cells; a cell, of the multiple cells, that has a smallest sub-carrier spacing among all cells of the multiple cells; or a cell, of the multiple cells, that has a largest sub-carrier spacing among all cells of the multiple cells.

In a twenty-eighth aspect, alone or in combination with one or more of the first through twenty-seventh aspects, process 1200 includes determining a set of TDRA parameters for a cell, of the multiple cells, other than the reference cell, based at least in part on performing a calculation using one or more modification parameters and the single set of TDRA parameters.

In a twenty-ninth aspect, alone or in combination with one or more of the first through twenty-eighth aspects, the calculation includes at least one of applying an offset to a parameter of the single set of TDRA parameters, applying a scaling factor to a parameter of the single set of TDRA parameters, or a combination thereof.

In a thirtieth aspect, alone or in combination with one or more of the first through twenty-ninth aspects, process 1200 includes transmitting a configuration that indicates the one or more modification parameters.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The following provides an overview of some aspects of the present disclosure:

Aspect 1: A method of wireless communication performed by a user equipment (UE), comprising: receiving a single downlink control information (DCI) message that schedules communications on multiple cells, wherein the single DCI message indicates multiple time domain resource assignments (TDRAs) corresponding to the multiple cells, wherein each of the multiple TDRAs corresponds to a different scheduled communication; and communicating using the multiple TDRAs corresponding to the multiple cells, wherein the communicating comprises: transmitting the communications using the multiple TDRAs corresponding to the multiple cells, or receiving the communications using the multiple TDRAs corresponding to the multiple cells.

Aspect 2: The method of aspect 1, wherein the communications are downlink communications, the multiple TDRAs are multiple downlink TDRAs, and the communicating comprises receiving the downlink communications using the multiple TDRAs corresponding to the multiple cells.

Aspect 3: The method of aspect 1, wherein the communications are uplink communications, the multiple TDRAs are multiple uplink TDRAs, and the communicating comprises transmitting the uplink communications using the multiple TDRAs corresponding to the multiple cells.

Aspect 4: The method of any of aspects 1-3, wherein the single DCI message includes a single TDRA index value within a single TDRA field, wherein the single TDRA index value indicates a single set of TDRA parameters, in a single TDRA table, that is to be used for all of the multiple cells.

Aspect 5: The method of aspect 4, further comprising receiving a configuration that indicates the single TDRA table to be used for single DCI scheduling of multiple cells.

Aspect 6: The method of any of aspects 4-5, wherein the single TDRA table is different from all TDRA tables configured for the multiple cells.

Aspect 7: The method of any of aspects 4-6, wherein the single TDRA table is a TDRA table associated with: a cell on which the single DCI message is received, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

Aspect 8: The method of any of aspects 1-3, wherein the single DCI message includes a single TDRA index value within a single TDRA field, wherein the single TDRA index value indicates multiple sets of TDRA parameters in corresponding multiple TDRA tables, wherein each set of TDRA parameters corresponds to a different cell of the multiple cells.

Aspect 9: The method of aspect 8, wherein the multiple sets of TDRA parameters are associated with a same row index in different TDRA tables.

Aspect 10: The method of any of aspects 8-9, wherein a number of bits included in the single TDRA field is based at least in part on a number of rows in a TDRA table of the multiple TDRA tables, wherein all TDRA tables of the multiple TDRA tables include a same number of rows.

Aspect 11: The method of any of aspects 8-9, wherein a number of bits included in the single TDRA field is based at least in part on a maximum number of rows permitted in a TDRA table of the multiple TDRA tables.

Aspect 12: The method of any of aspects 8-9, wherein a number of bits included in the single TDRA field is based at least in part on a smallest number of rows in a TDRA table compared to all other TDRA tables configured for the multiple cells.

Aspect 13: The method of any of aspects 8-9, wherein a number of bits included in the single TDRA field is based at least in part on a largest number of rows in a TDRA table compared to all other TDRA tables configured for the multiple cells.

Aspect 14: The method of any of aspects 8-9, wherein a number of bits included in the single TDRA field is based at least in part on a number of rows in a TDRA table associated with a specific cell.

Aspect 15: The method of aspect 14, wherein the specific cell is: a cell on which the single DCI message is received, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

Aspect 16: The method of any of aspects 8-9, wherein the single TDRA index value corresponds to a row index that is greater than a number of rows in a TDRA table associated with a cell of the multiple cells.

Aspect 17: The method of aspect 16, wherein the UE is configured to refrain from scheduling a communication, of the communications scheduled by the single DCI message, in the cell based at least in part on a determination that the single TDRA index value corresponds to a row index that is greater than the number of rows in the TDRA table associated with the cell.

Aspect 18: The method of aspect 16, wherein the UE is configured to schedule a communication, of the communications scheduled by the single DCI message, using a TDRA for the cell based at least in part on a determination that the single TDRA index value corresponds to a row index that is greater than the number of rows in the TDRA table associated with the cell, wherein the TDRA is determined based at least in part on performing a modulo operation using the single TDRA index value and the number of rows in the TDRA table associated with the cell.

Aspect 19: The method of aspect 16, wherein the UE is configured to schedule a communication, of the communications scheduled by the single DCI message, using a specific TDRA for the cell based at least in part on a determination that the single TDRA index value corresponds to a row index that is greater than the number of rows in the TDRA table associated with the cell.

Aspect 20: The method of aspect 19, wherein the specific TDRA corresponds to a first row of the TDRA table or a last row of the TDRA table.

Aspect 21: The method of any of aspects 8-9, wherein a number of bits included in the single TDRA field is based at least in part on at least one of: a number of rows in a TDRA table of the multiple TDRA tables, wherein all TDRA tables of the multiple TDRA tables include a same number of rows, a maximum number of rows permitted in a TDRA table of the multiple TDRA tables, a smallest number of rows in a TDRA table compared to all other TDRA tables configured for the multiple cells, a largest number of rows in a TDRA table compared to all other TDRA tables configured for the multiple cells, or a number of rows in a TDRA table associated with a specific cell.

Aspect 22: The method of any of aspects 1-3, wherein the single DCI message includes multiple TDRA index values in corresponding multiple TDRA fields, wherein each TDRA index value corresponds to a different cell of the multiple cells.

Aspect 23: The method of aspect 22, wherein a number of cells, included in the multiple cells, is less than or equal to a threshold.

Aspect 24: The method of any of aspects 1-3, wherein the single DCI message includes a single TDRA index value within a single TDRA field, wherein the single TDRA index value indicates multiple sets of TDRA parameters associated with a single row index of a single TDRA table, wherein each set of TDRA parameters corresponds to a different cell of the multiple cells.

Aspect 25: The method of aspect 24, further comprising receiving a configuration that indicates a mapping between the multiple cells and the multiple sets of TDRA parameters.

Aspect 26: The method of aspect 25, further comprising determining a mapping between the multiple cells and the multiple sets of TDRA parameters based at least in part on cell identifiers of the multiple cells.

Aspect 27: The method of any of aspects 1-3, wherein the single DCI message includes a single TDRA index value within a single TDRA field, wherein the single TDRA index value indicates a single set of TDRA parameters, in a single TDRA table, that is to be used for a reference cell of the multiple cells.

Aspect 28: The method of aspect 27, wherein the reference cell is: a cell on which the single DCI message is received, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

Aspect 29: The method of any of aspects 27-28, further comprising determining a set of TDRA parameters for a cell, of the multiple cells, other than the reference cell based at least in part on performing a calculation using one or more modification parameters and the single set of TDRA parameters.

Aspect 30: The method of aspect 29, wherein the calculation includes at least one of applying an offset to a parameter of the single set of TDRA parameters, applying a scaling factor to a parameter of the single set of TDRA parameters, or a combination thereof.

Aspect 31: The method of any of aspects 29-30, further comprising receiving a configuration that indicates the one or more modification parameters.

Aspect 32: A method of wireless communication performed by a base station, comprising: transmitting a single downlink control information (DCI) message that schedules communications on multiple cells, wherein the single DCI message indicates multiple time domain resource assignments (TDRAs) corresponding to the multiple cells, wherein each of the multiple TDRAs corresponds to a different scheduled communication; and communicating using the multiple TDRAs corresponding to the multiple cells, wherein the communicating comprises: transmitting the communications using the multiple TDRAs corresponding to the multiple cells, or receiving the communications using the multiple TDRAs corresponding to the multiple cells.

Aspect 33: The method of aspect 32, wherein the communications are downlink communications, the multiple TDRAs are multiple downlink TDRAs, and the communicating comprises transmitting the downlink communications using the multiple TDRAs corresponding to the multiple cells.

Aspect 34: The method of aspect 32, wherein the communications are uplink communications, the multiple TDRAs are multiple uplink TDRAs, and the communicating comprises receiving the uplink communications using the multiple TDRAs corresponding to the multiple cells.

Aspect 35: The method of any of aspects 32-34, wherein the single DCI message includes a single TDRA index value within a single TDRA field, wherein the single TDRA index value indicates a single set of TDRA parameters, in a single TDRA table, that is to be used for all of the multiple cells.

Aspect 36: The method of aspect 35, further comprising transmitting a configuration that indicates the single TDRA table to be used for single DCI scheduling of multiple cells.

Aspect 37: The method of any of aspects 35-36, wherein the single TDRA table is different from all TDRA tables configured for the multiple cells.

Aspect 38: The method of any of aspects 35-37, wherein the single TDRA table is a TDRA table associated with: a cell on which the single DCI message is transmitted, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

Aspect 39: The method of any of aspects 32-34, wherein the single DCI message includes a single TDRA index value within a single TDRA field, wherein the single TDRA index value indicates multiple sets of TDRA parameters in corresponding multiple TDRA tables, wherein each set of TDRA parameters corresponds to a different cell of the multiple cells.

Aspect 40: The method of aspect 39, wherein the multiple sets of TDRA parameters are associated with a same row index in different TDRA tables.

Aspect 41: The method of any of aspects 39-40, wherein a number of bits included in the single TDRA field is based at least in part on a number of rows in a TDRA table of the multiple TDRA tables, wherein all TDRA tables of the multiple TDRA tables include a same number of rows.

Aspect 42: The method of any of aspects 39-40, wherein a number of bits included in the single TDRA field is based at least in part on a maximum number of rows permitted in a TDRA table of the multiple TDRA tables.

Aspect 43: The method of any of aspects 39-40, wherein a number of bits included in the single TDRA field is based at least in part on a smallest number of rows in a TDRA table compared to all other TDRA tables configured for the multiple cells.

Aspect 44: The method of any of aspects 39-40, wherein a number of bits included in the single TDRA field is based at least in part on a largest number of rows in a TDRA table compared to all other TDRA tables configured for the multiple cells.

Aspect 45: The method of any of aspects 39-40, wherein a number of bits included in the single TDRA field is based at least in part on a number of rows in a TDRA table associated with a specific cell.

Aspect 46: The method of aspect 45, wherein the specific cell is: a cell on which the single DCI message is transmitted, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

Aspect 47: The method of any of aspects 39-40, wherein the single TDRA index value corresponds to a row index that is greater than a number of rows in a TDRA table associated with a cell of the multiple cells.

Aspect 48: The method of aspect 47, wherein the base station is configured to refrain from scheduling a communication, of the communications scheduled by the single DCI message, in the cell based at least in part on a determination that the single TDRA index value corresponds to a row index that is greater than the number of rows in the TDRA table associated with the cell.

Aspect 49: The method of aspect 47, wherein the base station is configured to schedule a communication, of the communications scheduled by the single DCI message, using a TDRA for the cell based at least in part on a determination that the single TDRA index value corresponds to a row index that is greater than the number of rows in the TDRA table associated with the cell, wherein the TDRA is determined based at least in part on performing a modulo operation using the single TDRA index value and the number of rows in the TDRA table associated with the cell.

Aspect 50: The method of aspect 47, wherein the base station is configured to schedule a communication, of the communications scheduled by the single DCI message, using a specific TDRA for the cell based at least in part on a determination that the single TDRA index value corresponds to a row index that is greater than the number of rows in the TDRA table associated with the cell.

Aspect 51: The method of aspect 50, wherein the specific TDRA corresponds to a first row of the TDRA table or a last row of the TDRA table.

Aspect 52: The method of any of aspects 39-40, wherein a number of bits included in the single TDRA field is based at least in part on at least one of: a number of rows in a TDRA table of the multiple TDRA tables, wherein all TDRA tables of the multiple TDRA tables include a same number of rows, a maximum number of rows permitted in a TDRA table of the multiple TDRA tables, a smallest number of rows in a TDRA table compared to all other TDRA tables configured for the multiple cells, a largest number of rows in a TDRA table compared to all other TDRA tables configured for the multiple cells, or a number of rows in a TDRA table associated with a specific cell.

Aspect 53: The method of any of aspects 32-34, wherein the single DCI message includes multiple TDRA index values in corresponding multiple TDRA fields, wherein each TDRA index value corresponds to a different cell of the multiple cells.

Aspect 54: The method of aspect 53, wherein a number of cells, included in the multiple cells, is less than or equal to a threshold.

Aspect 55: The method of any of aspects 32-34, wherein the single DCI message includes a single TDRA index value within a single TDRA field, wherein the single TDRA index value indicates multiple sets of TDRA parameters associated with a single row index of a single TDRA table, wherein each set of TDRA parameters corresponds to a different cell of the multiple cells.

Aspect 56: The method of aspect 55, further comprising transmitting a configuration that indicates a mapping between the multiple cells and the multiple sets of TDRA parameters.

Aspect 57: The method of any of aspects 55-56, further comprising determining a mapping between the multiple cells and the multiple sets of TDRA parameters based at least in part on cell identifiers of the multiple cells.

Aspect 58: The method of any of aspects 32-34, wherein the single DCI message includes a single TDRA index value within a single TDRA field, wherein the single TDRA index value indicates a single set of TDRA parameters, in a single TDRA table, that is to be used for a reference cell of the multiple cells.

Aspect 59: The method of aspect 58, wherein the reference cell is: a cell on which the single DCI message is transmitted, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

Aspect 60: The method of any of aspects 58-59, further comprising determining a set of TDRA parameters for a cell, of the multiple cells, other than the reference cell based at least in part on performing a calculation using one or more modification parameters and the single set of TDRA parameters.

Aspect 61: The method of aspect 60, wherein the calculation includes at least one of applying an offset to a parameter of the single set of TDRA parameters, applying a scaling factor to a parameter of the single set of TDRA parameters, or a combination thereof.

Aspect 62: The method of any of aspects 60-61, further comprising transmitting a configuration that indicates the one or more modification parameters.

Aspect 62: An apparatus for wireless communication at a device, comprising a processor; memory coupled with the processor; and instructions stored in the memory and executable by the processor to cause the apparatus to perform the method of one or more aspects of aspects 1-31.

Aspect 63: A device for wireless communication, comprising a memory and one or more processors coupled to the memory, the memory and the one or more processors configured to perform the method of one or more aspects of aspects 1-31.

Aspect 64: An apparatus for wireless communication, comprising at least one means for performing the method of one or more aspects of aspects 1-31.

Aspect 65: A non-transitory computer-readable medium storing code for wireless communication, the code comprising instructions executable by a processor to perform the method of one or more aspects of aspects 1-31.

Aspect 66: A non-transitory computer-readable medium storing a set of instructions for wireless communication, the set of instructions comprising one or more instructions that, when executed by one or more processors of a device, cause the device to perform the method of one or more aspects of aspects 1-31.

Aspect 67: An apparatus for wireless communication at a device, comprising a processor; memory coupled with the processor; and instructions stored in the memory and executable by the processor to cause the apparatus to perform the method of one or more aspects of aspects 32-62.

Aspect 68: A device for wireless communication, comprising a memory and one or more processors coupled to the memory, the memory and the one or more processors configured to perform the method of one or more aspects of aspects 32-62.

Aspect 69: An apparatus for wireless communication, comprising at least one means for performing the method of one or more aspects of aspects 32-62.

Aspect 70: A non-transitory computer-readable medium storing code for wireless communication, the code comprising instructions executable by a processor to perform the method of one or more aspects of aspects 32-62.

Aspect 71: A non-transitory computer-readable medium storing a set of instructions for wireless communication, the set of instructions comprising one or more instructions that, when executed by one or more processors of a device, cause the device to perform the method of one or more aspects of aspects 32-62.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a single downlink control information (DCI) message that schedules communications on multiple cells, wherein the single DCI message indicates multiple time domain resource assignments (TDRAs) corresponding to the multiple cells, wherein each of the multiple TDRAs corresponds to a different scheduled communication,
      wherein the single DCI message includes a single TDRA index value within a single TDRA field, wherein the single TDRA index value indicates:
         a single set of TDRA parameters, in a single TDRA table, that is to be used for all of the multiple cells, wherein the single TDRA table is different from all TDRA tables configured for the multiple cells, or
         multiple sets of TDRA parameters in corresponding multiple TDRA tables, wherein each set of TDRA parameters corresponds to a different cell of the multiple cells, wherein the multiple sets of TDRA parameters are associated with a same row index in different TDRA tables; and
   communicating using the multiple TDRAs corresponding to the multiple cells, wherein the communicating comprises:
      transmitting the communications using the multiple TDRAs corresponding to the multiple cells, or
      receiving the communications using the multiple TDRAs corresponding to the multiple cells.

2. The method of claim 1, further comprising receiving a configuration that indicates the single TDRA table to be used for single DCI scheduling of multiple cells.

3. The method of claim 1, wherein the single TDRA table is a TDRA table associated with:
   a cell on which the single DCI message is received,
   a cell, of the multiple cells, that has a smallest cell identifier among all cells of the multiple cells,
   a cell, of the multiple cells, that has a largest cell identifier among all cells of the multiple cells,
   a cell, of the multiple cells, that has a smallest sub-carrier spacing among all cells of the multiple cells, or
   a cell, of the multiple cells, that has a largest sub-carrier spacing among all cells of the multiple cells.

4. The method of claim 1, wherein a number of bits included in the single TDRA field is based at least in part on at least one of:
   a number of rows in a TDRA table of the multiple TDRA tables, wherein all TDRA tables of the multiple TDRA tables include a same number of rows, a maximum number of rows permitted in a TDRA table of the multiple TDRA tables,
a smallest number of rows in a TDRA table compared to all other TDRA tables configured for the multiple cells,
a largest number of rows in a TDRA table compared to all other TDRA tables configured for the multiple cells, or
a number of rows in a TDRA table associated with a specific cell.

5. The method of claim 1, wherein the single TDRA index value corresponds to a row index that is greater than a number of rows in a TDRA table associated with a cell of the multiple cells.

6. The method of claim 5, wherein the UE is configured to refrain from scheduling a communication, of the communications scheduled by the single DCI message, in the cell based at least in part on a determination that the single TDRA index value corresponds to a row index that is greater than the number of rows in the TDRA table associated with the cell.

7. The method of claim 5, wherein the UE is configured to schedule a communication, of the communications scheduled by the single DCI message, using a TDRA for the cell based at least in part on a determination that the single TDRA index value corresponds to a row index that is greater than the number of rows in the TDRA table associated with the cell, wherein the TDRA is determined based at least in part on performing a modulo operation using the single TDRA index value and the number of rows in the TDRA table associated with the cell.

8. The method of claim 5, wherein the UE is configured to schedule a communication, of the communications scheduled by the single DCI message, using a specific TDRA for the cell based at least in part on a determination that the single TDRA index value corresponds to a row index that is greater than the number of rows in the TDRA table associated with the cell, wherein the specific TDRA corresponds to a first row of the TDRA table or a last row of the TDRA table.

9. The method of claim 1, wherein the single DCI message includes multiple TDRA index values in corresponding multiple TDRA fields, wherein each TDRA index value corresponds to a different cell of the multiple cells.

10. The method of claim 1, wherein the single TDRA index value indicates multiple sets of TDRA parameters associated with a single row index of a single TDRA table, wherein each set of TDRA parameters corresponds to a different cell of the multiple cells.

11. The method of claim 10, further comprising receiving a configuration that indicates a mapping between the multiple cells and the multiple sets of TDRA parameters; or determining a mapping between the multiple cells and the multiple sets of TDRA parameters based at least in part on cell identifiers of the multiple cells.

12. The method of claim 1, wherein the single TDRA index value indicates a single set of TDRA parameters, in a single TDRA table, that is to be used for a reference cell of the multiple cells.

13. The method of claim 12, further comprising determining a set of TDRA parameters for a cell, of the multiple cells, other than the reference cell based at least in part on performing a calculation using one or more modification parameters and the single set of TDRA parameters, wherein the calculation includes at least one of applying an offset to a parameter of the single set of TDRA parameters, applying a scaling factor to a parameter of the single set of TDRA parameters, or a combination thereof.

14. The method of claim 13, further comprising receiving a configuration that indicates the one or more modification parameters.

15. A user equipment (UE) for wireless communication, comprising:
a memory; and
one or more processors coupled to the memory, the one or more processors configured to:
receive a single downlink control information (DCI) message that schedules communications on multiple cells, wherein the single DCI message indicates multiple time domain resource assignments (TDRAs) corresponding to the multiple cells, wherein each of the multiple TDRAs corresponds to a different scheduled communication,
wherein the single DCI message includes a single TDRA index value within a single TDRA field, wherein the single TDRA index value indicates:
a single set of TDRA parameters, in a single TDRA table, that is to be used for all of the multiple cells, wherein the single TDRA table is different from all TDRA tables configured for the multiple cells, or
multiple sets of TDRA parameters in corresponding multiple TDRA tables, wherein each set of TDRA parameters corresponds to a different cell of the multiple cells, wherein the multiple sets of TDRA parameters are associated with a same row index in different TDRA tables; and
communicate using the multiple TDRAs corresponding to the multiple cells, wherein the communicating comprises:
transmitting the communications using the multiple TDRAs corresponding to the multiple cells, or
receiving the communications using the multiple TDRAs corresponding to the multiple cells.

16. The UE of claim 15, wherein the one or more processors are further configured to receive a configuration that indicates the single TDRA table to be used for single DCI scheduling of multiple cells.

17. The UE of claim 15, wherein the single TDRA table is a TDRA table associated with:
a cell on which the single DCI message is received,
a cell, of the multiple cells, that has a smallest cell identifier among all cells of the multiple cells,
a cell, of the multiple cells, that has a largest cell identifier among all cells of the multiple cells,
a cell, of the multiple cells, that has a smallest sub-carrier spacing among all cells of the multiple cells, or
a cell, of the multiple cells, that has a largest sub-carrier spacing among all cells of the multiple cells.

18. The UE of claim 15, wherein a number of bits included in the single TDRA field is based at least in part on at least one of:
a number of rows in a TDRA table of the multiple TDRA tables, wherein all TDRA tables of the multiple TDRA tables include a same number of rows,
a maximum number of rows permitted in a TDRA table of the multiple TDRA tables,
a smallest number of rows in a TDRA table compared to all other TDRA tables configured for the multiple cells,
a largest number of rows in a TDRA table compared to all other TDRA tables configured for the multiple cells,
a number of rows in a TDRA table associated with a specific cell.

19. The UE of claim 15, wherein the single DCI message includes multiple TDRA index values in corresponding multiple TDRA fields, wherein each TDRA index value corresponds to a different cell of the multiple cells.

20. The UE of claim 15, wherein the single TDRA index value indicates multiple sets of TDRA parameters associated with a single row index of a single TDRA table, wherein each set of TDRA parameters corresponds to a different cell of the multiple cells.

21. The UE of claim 15, wherein the single TDRA index value indicates a single set of TDRA parameters, in a single TDRA table, that is to be used for a reference cell of the multiple cells.

22. The UE of claim 21, wherein the memory and the one or more processors are further configured to determine a set of TDRA parameters for a cell, of the multiple cells, other than the reference cell based at least in part on performing a calculation using one or more modification parameters and the single set of TDRA parameters, wherein the calculation includes at least one of applying an offset to a parameter of the single set of TDRA parameters, applying a scaling factor to a parameter of the single set of TDRA parameters, or a combination thereof.

23. A non-transitory computer-readable medium storing a set of instructions for wireless communication, the set of instructions comprising:

one or more instructions that, when executed by one or more processors of a user equipment (UE), cause the UE to:

receive a single downlink control information (DCI) message that schedules communications on multiple cells, wherein the single DCI message indicates multiple time domain resource assignments (TDRAs) corresponding to the multiple cells, wherein each of the multiple TDRAs corresponds to a different scheduled communication, wherein the single DCI message includes a single TDRA index value within a single TDRA field, wherein the single TDRA index value indicates:

a single set of TDRA parameters, in a single TDRA table, that is to be used for all of the multiple cells, wherein the single TDRA table is different from all TDRA tables configured for the multiple cells, or multiple sets of TDRA parameters in corresponding multiple TDRA tables, wherein each set of TDRA parameters corresponds to a different cell of the multiple cells, wherein the multiple sets of TDRA parameters are associated with a same row index in different TDRA tables; and communicate using the multiple TDRAs corresponding to the multiple cells, wherein the communicating comprises:

transmit the communications using the multiple TDRAs corresponding to the multiple cells, or receive the communications using the multiple TDRAs corresponding to the multiple cells.

24. The non-transitory computer-readable medium of claim 23, wherein the one or more instructions that, when executed by one or more processors of the UE, further cause the UE to:

receive a configuration that indicates the single TDRA table to be used for single DCI scheduling of multiple cells.

25. The non-transitory computer-readable medium of claim 23, wherein the single TDRA table is a TDRA table associated with:

a cell on which the single DCI message is received, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

26. The non-transitory computer-readable medium of claim 23, wherein a number of bits included in the single TDRA field is based at least in part on at least one of:

a number of rows in a TDRA table of the multiple TDRA tables, wherein all TDRA tables of the multiple TDRA tables include a same number of rows, a maximum number of rows permitted in a TDRA table of the multiple TDRA tables, a smallest number of rows in a TDRA table compared to all other TDRA tables configured for the multiple cells, a largest number of rows in a TDRA table compared to all other TDRA tables configured for the multiple cells, or a number of rows in a TDRA table associated with a specific cell.

27. An apparatus for wireless communication, comprising:

means for receiving a single downlink control information (DCI) message that schedules communications on multiple cells, wherein the single DCI message indicates multiple time domain resource assignments (TDRAs) corresponding to the multiple cells, wherein each of the multiple TDRAs corresponds to a different scheduled communication, wherein the single DCI message includes a single TDRA index value within a single TDRA field, wherein the single TDRA index value indicates:

a single set of TDRA parameters, in a single TDRA table, that is to be used for all of the multiple cells, wherein the single TDRA table is different from all TDRA tables configured for the multiple cells, or multiple sets of TDRA parameters in corresponding multiple TDRA tables, wherein each set of TDRA parameters corresponds to a different cell of the multiple cells, wherein the multiple sets of TDRA parameters are associated with a same row index in different TDRA tables; and means for communicating using the multiple TDRAs corresponding to the multiple cells, wherein the communicating comprises:

means for transmitting the communications using the multiple TDRAs corresponding to the multiple cells, or means for receiving the communications using the multiple TDRAs corresponding to the multiple cells.

28. The apparatus of claim 27, further comprising:

means for receiving a configuration that indicates the single TDRA table to be used for single DCI scheduling of multiple cells.

29. The apparatus of claim 27, wherein the single TDRA table is a TDRA table associated with:

a cell on which the single DCI message is received, a cell, of the multiple cells, that has a smallest cell identifier among all cells of the multiple cells, a cell, of the multiple cells, that has a largest cell identifier among all cells of the multiple cells, a cell, of the multiple cells, that has a smallest sub-carrier spacing among all cells of the multiple cells, or a cell, of the multiple cells, that has a largest sub-carrier spacing among all cells of the multiple cells.

30. The apparatus of claim 27, wherein a number of bits included in the single TDRA field is based at least in part on at least one of:
- a number of rows in a TDRA table of the multiple TDRA tables, wherein all TDRA tables of the multiple TDRA tables include a same number of rows,
- a maximum number of rows permitted in a TDRA table of the multiple TDRA tables,
- a smallest number of rows in a TDRA table compared to all other TDRA tables configured for the multiple cells,
- a largest number of rows in a TDRA table compared to all other TDRA tables configured for the multiple cells, or
- a number of rows in a TDRA table associated with a specific cell.

* * * * *